United States Patent [19]
White et al.

[11] Patent Number: 5,737,756
[45] Date of Patent: Apr. 7, 1998

[54] DUAL BUS COMPUTER NETWORK USING DUAL BUSSES WITH DUAL SPY MODULES ENABLING CLEARING OF INVALIDATION QUEUE FOR PROCESSOR WITH STORE THROUGH CACHE WHILE PROVIDING RETRY CYCLES FOR INCOMPLETE ACCESSES TO INVALIDATION QUEUE

[75] Inventors: Theodore Curt White; Jayesh Vrajlal Sheth, both of Mission Viejo, Calif.

[73] Assignee: Unisys Corporation, Blue Bell, Pa.

[21] Appl. No.: 701,039

[22] Filed: Aug. 21, 1996

Related U.S. Application Data

[63] Continuation of Ser. No. 432,047, Apr. 28, 1995, abandoned.

[51] Int. Cl.[6] .............................. G06F 12/08; G06F 13/00
[52] U.S. Cl. .............................. 711/142; 364/DIG. 1; 364/231.8; 364/243.4; 364/964.342; 711/118; 711/141; 711/145; 711/146; 711/154
[58] Field of Search ................... 364/DIG. 1, 243.4, 364/231.8, 964.342; 711/118, 140, 141, 142, 143, 144, 145, 146, 154

[56] References Cited

U.S. PATENT DOCUMENTS

| | | | |
|---|---|---|---|
| 4,141,067 | 2/1979 | McLagan | 395/468 |
| 4,992,930 | 2/1991 | Gilfeather et al. | 395/469 |
| 5,058,006 | 10/1991 | Durdan et al. | 395/449 |
| 5,091,846 | 2/1992 | Sachs et al. | 395/469 |
| 5,119,485 | 6/1992 | Ledbetter et al. | 395/469 |
| 5,155,824 | 10/1992 | Edenfield et al. | 395/470 |
| 5,206,941 | 4/1993 | Eilall et al. | 395/469 |
| 5,283,886 | 2/1994 | Nishii et al. | 395/471 |
| 5,317,720 | 5/1994 | Stamm et al. | 395/469 |
| 5,333,296 | 7/1994 | Bouchard et al. | 395/469 |
| 5,335,335 | 8/1994 | Jackson et al. | 395/469 |
| 5,341,487 | 8/1994 | Derwin et al. | 395/469 |
| 5,398,325 | 3/1995 | Chang et al. | 395/469 |
| 5,432,918 | 7/1995 | Stamm | 395/469 |
| 5,434,993 | 7/1995 | Liencres et al. | 395/460 |
| 5,446,863 | 8/1995 | Stevens et al. | 395/427 |
| 5,506,967 | 4/1996 | Barajas et al. | 395/250 |

*Primary Examiner*—Tod R. Swann
*Assistant Examiner*—Tuan V. Thai
*Attorney, Agent, or Firm*—Alfred W. Kozak; Mark T. Starr; Steven R. Petersen

[57] ABSTRACT

A system and method for enhancing the rapidity of invalidation cycles in a processor having store-through cache holding 4-word data packets whereby an invalidation queue holds addresses of data to be invalidated in cache and the addresses are supplied by a system bus spy module which monitors the addresses of new data words selected for a write operation.

2 Claims, 16 Drawing Sheets

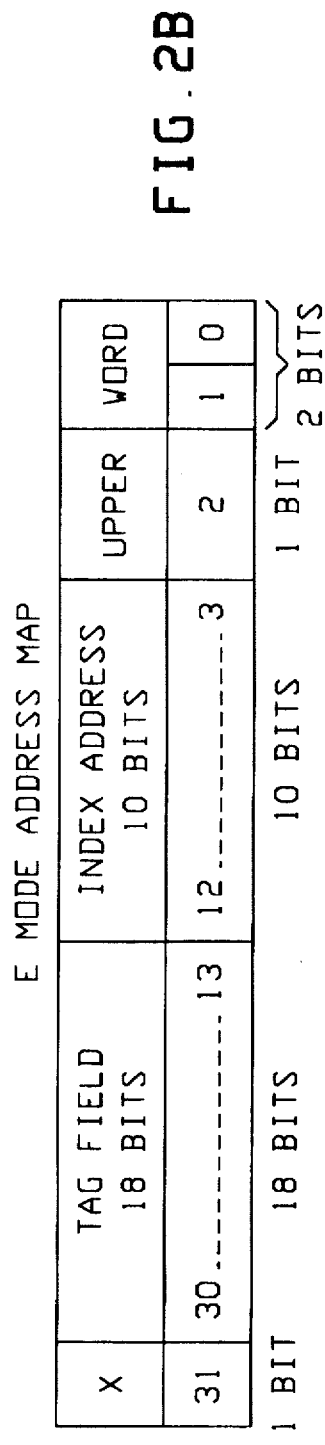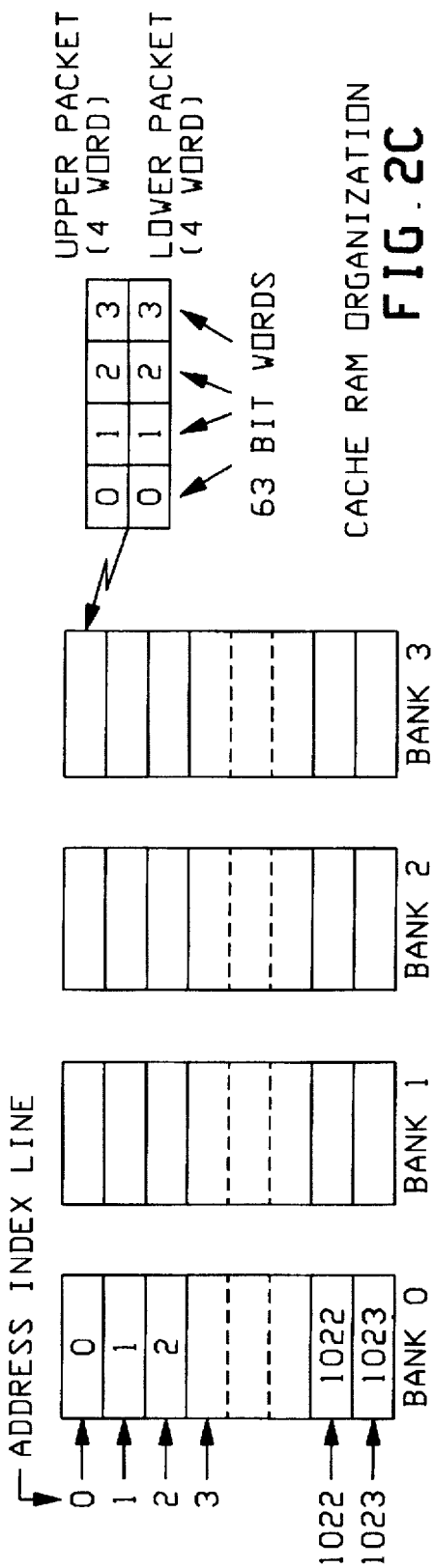
FIG. 2B  FIG. 2C  FIG. 2D

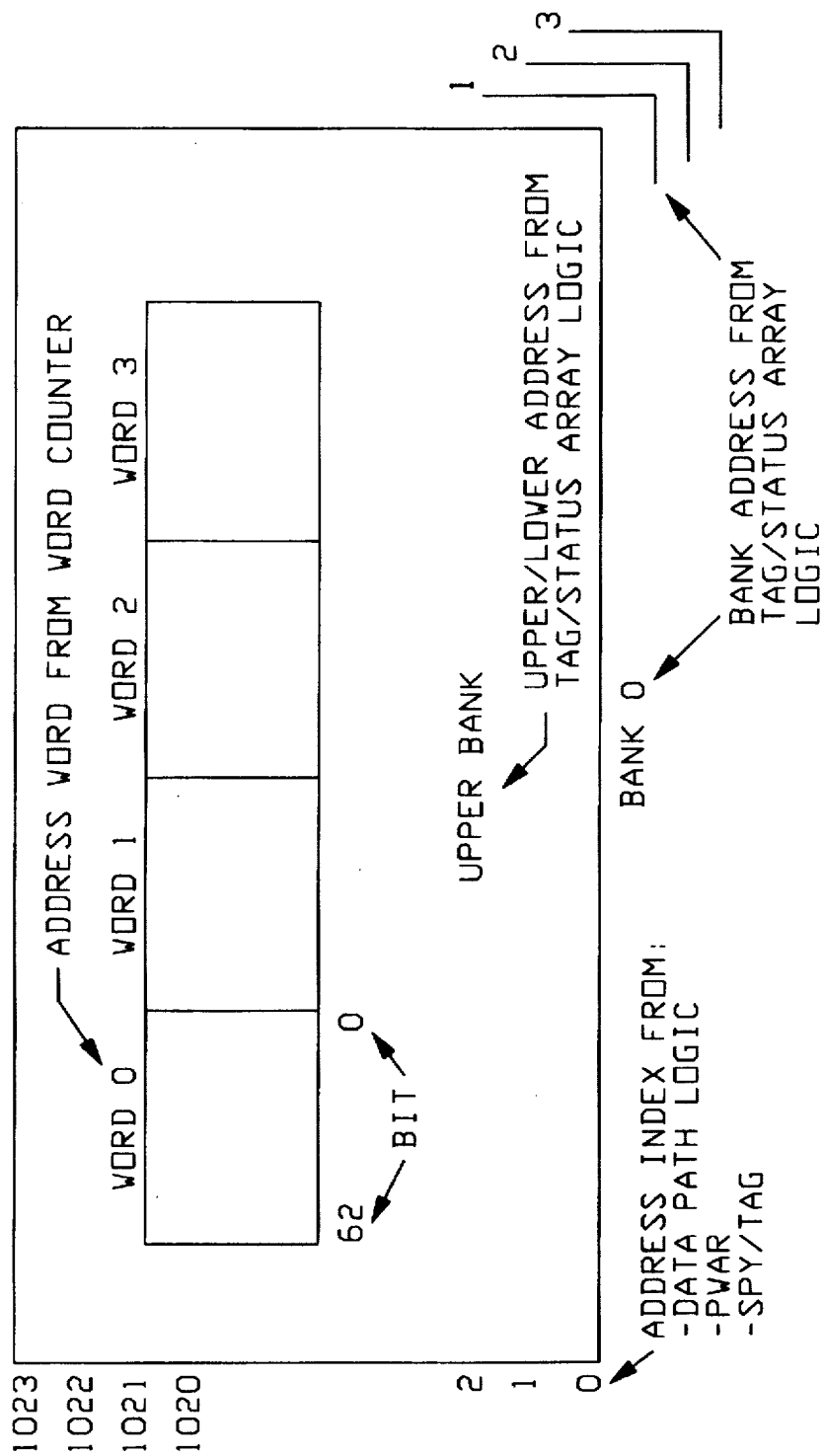

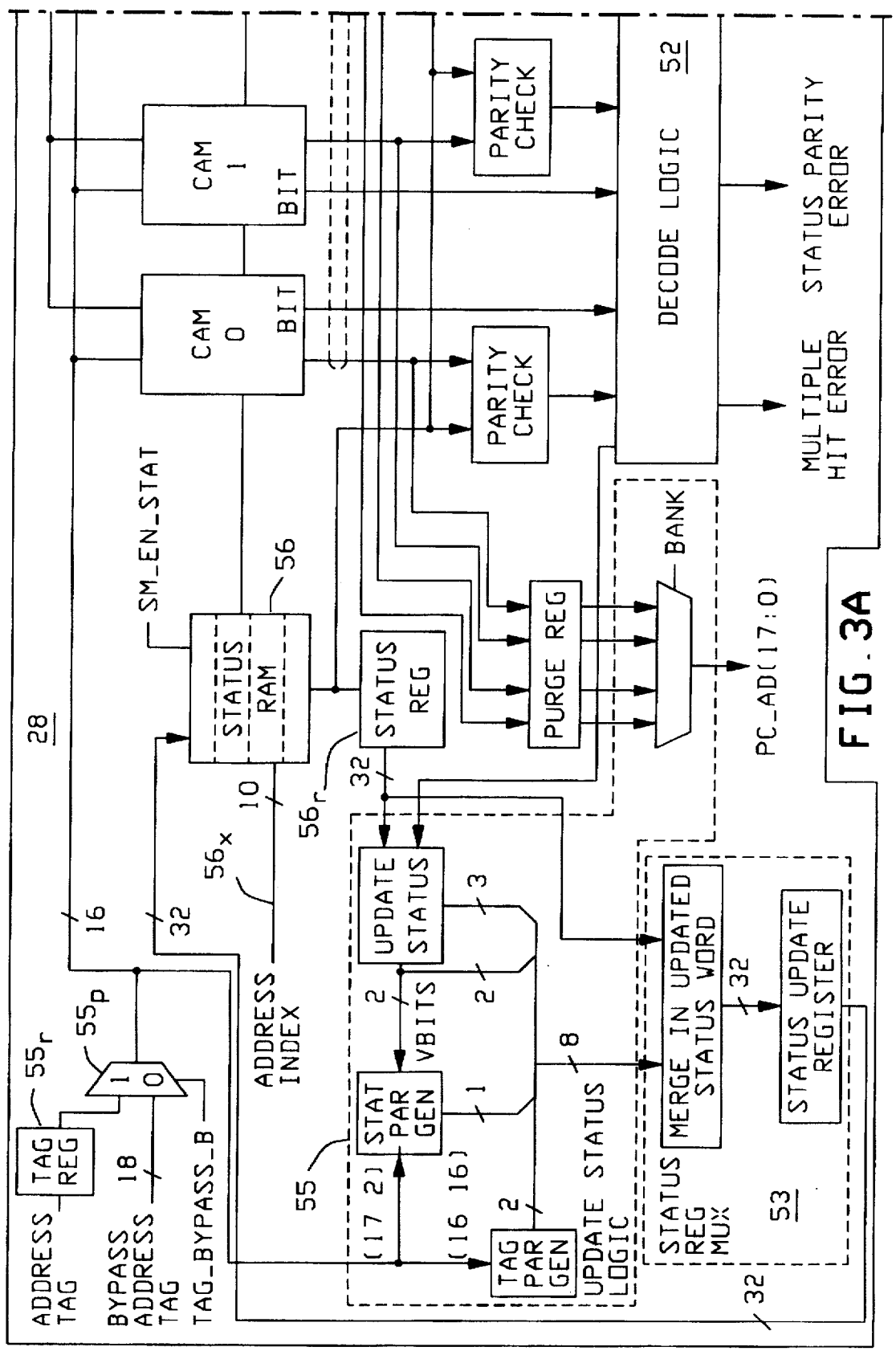

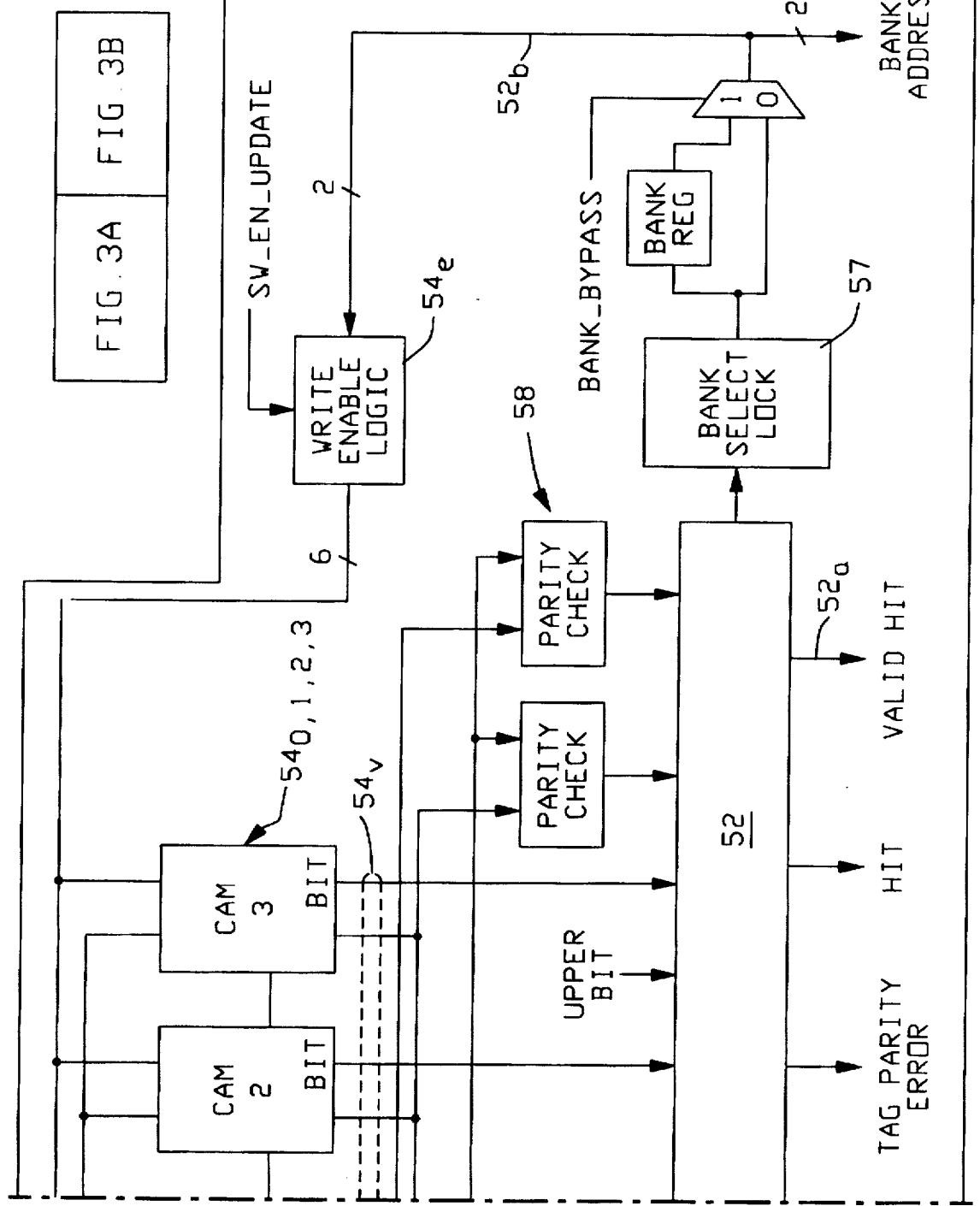

FIG. 5  STATE MACHINE 30 ENVIRONMENT

DUAL BUS COMPUTER NETWORK USING DUAL BUSSES WITH DUAL SPY MODULES ENABLING CLEARING OF INVALIDATION QUEUE FOR PROCESSOR WITH STORE THROUGH CACHE WHILE PROVIDING RETRY CYCLES FOR INCOMPLETE ACCESSES TO INVALIDATION QUEUE

This is a continuation of application Ser. No. 08/432,047 filed on Apr. 28, 1995 now abandoned.

FIELD OF THE INVENTION

This disclosure relates to systems and methods used in cache-processor modules for enabling the invalidation of data words that are no longer coherent.

BACKGROUND OF THE INVENTION

Modern computer system architectures are generally known to use cache memories in order to reduce the access time for accessing data by a central processing unit instead of having to spend the extra time periods necessary to reach main memory and pull back the required data. Thus, with the use of cache memories there is an increase in system performance.

Generally, the main memory in computing systems consists of an array of memory devices which have speeds relatively slow compared to the processor speed. Thus, when the processor seeks access to main memory, the processor is required to wait a number of cycles in order to accommodate the retrieval of data from the slower memory devices.

A cache memory is significantly faster and provides local storage for data and instruction codes which are frequently used by the processor. The processor and the central processing unit will only need to access the main memory if the required information is not available in the cache. One activity in computer systems with cache memories is the handling of Write operations by the processor or Write operations which may come from an external module on a system bus. At any given period or moment of time, there can be two copies of a item of data or an instruction code in existence. That is to say, one can reside in main memory and a duplicate copy can reside in the cache. However, if a Write operation is made to either the main memory or the cache memory, this can result in a non-coherent situation between the two stored items of information which ideally should always be duplicates of each other.

When a processor performs a Write operation to a pre-determined address, then during a processor Write to a specialized address, the processor having a cache memory system will first check the contents of the cache memory for the required information. Then the processor may proceed to write new data into the cache at the same preselected address. However, since the data has been modified in the cache but not in the main memory, then the data in the cache and the data in the main memory are no longer coherent.

Likewise, an external resource module connected to a system bus may perform a Write operation to main memory and modify data in main memory, but not the corresponding address in the cache memory, thus providing a situation where the data in the cache and the data in the main memory are no longer coherent with each other.

Generally, systems, such as the presently described system, use a "Write-through" (store-through) cache which operates to provide a Write operation to both the cache memory and the main memory during processor Write operations, thus insuring consistency between the data in the cache memory and the main memory.

On the other hand, another type of cache memory designated as "Write-back" cache operates such that the processor writes only to the cache memory and sets a "invalid bit" to indicate those cache entries which have been changed by the processor, but which have not yet been made to conform by the main memory. When the altered cache entry with the "invalid bit" is later replaced into the main memory, then the invalid bit in the cache memory can be removed. One common method for insuring coherency between the addresses of data in the cache memory and the main memory during Read operations, is done by use of "snooping" techniques.

Thus, in the "Write-back" cache situation, bus snooping is employed to check the contents of the cache memory for altered data.

If the cache is used as a source of data to a requesting module on a system bus, then the main memory is prohibited from supplying data to that requesting bus module. Further, the operating system of the processor can execute an instruction to write the altered data from the cache into main memory prior to any Read operation to be taken from in memory. Thus, there will be consistency of data between the cache memory and the main memory.

During Write operations, any inconsistency of data between the cache memory and the main memory can be handled with a bus "snooping" technique. In either a "Write-through" or a "Write-back" cache memory, the bus snooping operation invalidates cache entries which have become "stale" or inconsistent with main memory following a Write operation to main memory. Further, invalidate instructions can be executed by the operating system prior to a main memory Write operation in order to write any altered data out to the main memory and to invalidate the contents of the cache memory.

In the case of a direct memory access operation to main memory, a single copy of the data will exist in main memory following the DMA (Direct Memory Access) instruction, and the direct memory access Write operation of main memory will not present the problem of stale data in the cache.

An "invalidate" operation is an instruction which marks data in the "Write-back" cache which may be accessed but which will be indicated as "invalid".

In multi-processor systems, when a certain processor stores data in the main memory, the main memory address for the store operation is broadcast to all the other processors sharing the same main memory in the system. Thus, each processor determines whether the data associated with the store address is present in its own local cache memory. If data is present at the specified address, then the processor is normally required to invalidate that data in its own local cache memory, or else is required to update it to make it the same as the main memory data. One difficulty in fanning out the store addresses lies in the fact that every cache memory in the system is forced to surrender a cycle for invalidation look-up whenever any processor performs a store operation.

The present system uses a four-word protocol whereby words of information or code words are accessed in four-word packets. A packet is made up of four words which is handled in a single transfer cycle. The four words are comprised of 24 bytes or 6 bytes per word.

The presently disclosed cache controller module and the system methodology provides an unusually rapid invalidation cycle by means of packet invalidation where a "cache line" can operate to invalidate four words in cache memory and an invalidation queue can be used together with state machines in order to provide a more rapid period of cache address invalidation cycles than previously provided.

SUMMARY OF THE INVENTION

The cache controller system of the present disclosure uses a plurality of static RAMs (each RAM of 32K words) each having a maximum access time of 8 nanoseconds. The cache is organized as a four-way set associative with a total cache size of 32K words. A cache tag storage arrangement is provided within a cache controller chip. The 32K words of data storage are provided by eight external data RAMs.

Cache storage within the cache controller chip is structured as four sets of 1024 lines of eight total words. Each line is divided into two blocks (sub-lines) of four words each. Both sub-lines respond to the same address stored in a tag-RAM, but each sub-line has independent "Valid" status bits. The correct sub-line is selected by an "Address-Upper" signal which is obtained from the address field of the incoming cache request. Cache "misses" operate on a single four-word sub-line at a time depending on a state of the "Valid" status bits.

The cache controller chip system operates on addresses and data supplied by an internal microprocessor or from data supplied by a bus interface unit and control signals supplied by a bus controller. The cache controller chip system performs selective sub-line invalidate operations on indicated lines received from a system bus spy logic module which monitors operations on two busses (dual system busses).

The system bus spy module has two state machines, each of which handles one of the dual busses in order to sense addresses of transmitted data which will require invalidation in the cache data RAMs. The system bus spy module sends the invalidation address to an invalidation queue which operates in conjunction with an external state machine in order to provide a rapid invalidation of addresses in a tag/status array-control unit. The address to be invalidated will invalidate a four-word group or packet of data, in one invalidation operational cycle.

The central processor addresses single words only while the cache is organized for access of 4-word packets. The dual system busses carry single words (and word addresses) which are packaged into 4-word packets by a bus interface unit for conveyance to the cache memory.

In the context of this architecture, the system provides a method of regulating the status condition of words in a store-through cache to determine their useability in a network situation where dual system busses connected to external resource modules and main memory can cause the existing data words in the cache to no longer be coherent with new data write-words applied to the system.

BRIEF DESCRIPTION OF THE DRAWINGS

FIG. 2B is schematic drawing of the address map for the cache data RAMS;

FIG. 2C is a schematic drawing showing how the cache data RAM is organized with four banks addressable via 1024 cache lines where each line can access a 4-word upper or 4-word lower packet;

FIG. 2D is a schematic drawing showing how a packet of four words is addressed and how one cache address line will access to either an upper or lower 4-word packet;

FIG. 2E illustrates how an upper 4-word packet is addressed;

FIG. 3 is a more detailed drawing of the tag/status array and decode logic block;

GENERAL OVERVIEW

Figure 1:
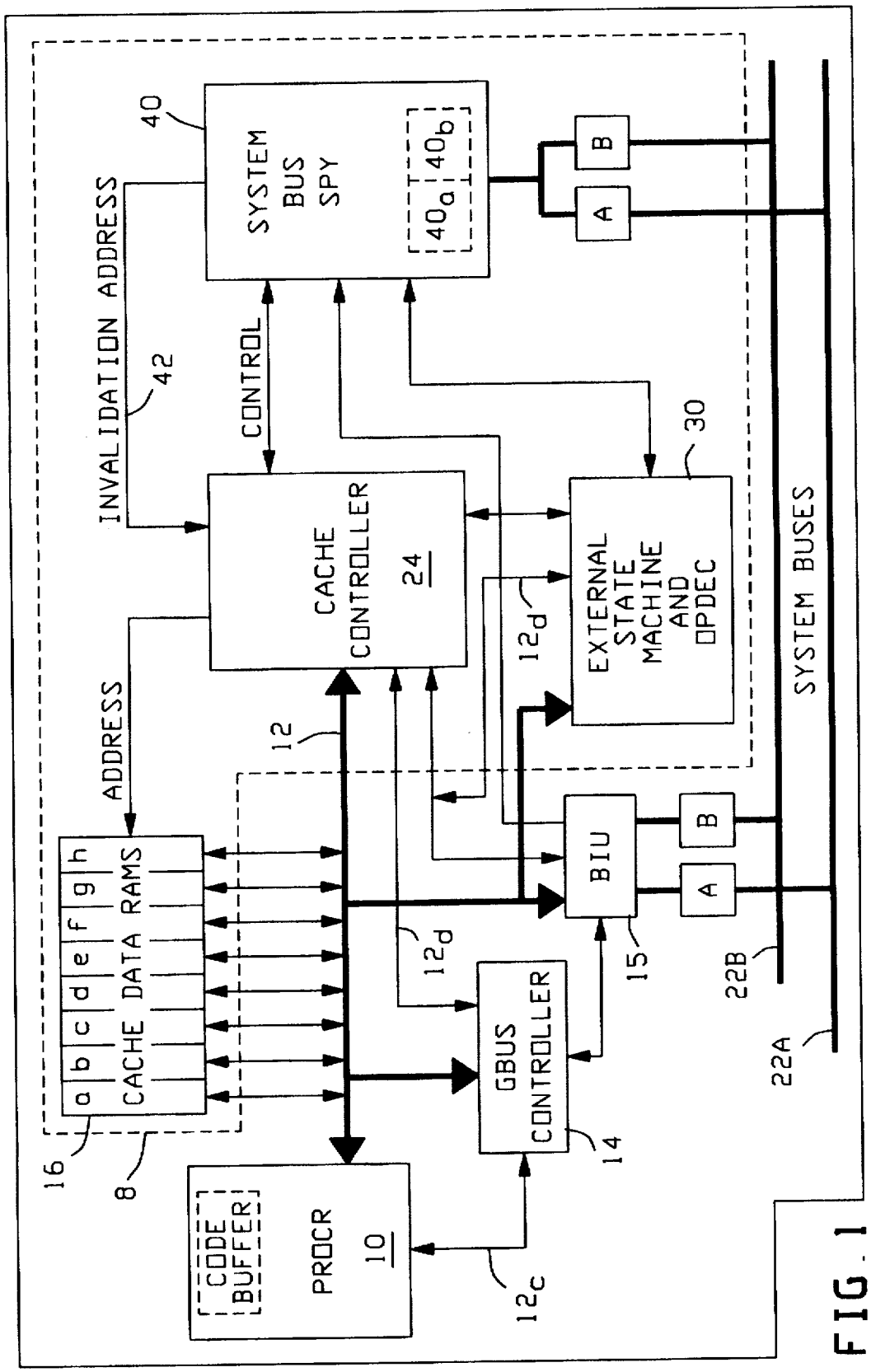
FIG. 1 is an architectural drawing of a computer system where a central processing unit uses a cache memory controlled by a cache controller and operates through a bus interface unit through dual system busses.

As seen in FIG. 1, there is provided a computer system network wherein a central processing unit 10 functions in conjunction with a cache memory 16 through use of a bus 12 (GBUS). The central processing unit may be operated, for example, at a clock frequency of 32 MHz and be serviced by a store-through cache, such as the cache module 16 of FIG. 1.

The architecture for the system includes a cache controller 24 which resides on a single chip while the cache data RAMS 16 are provided with 8 static RAMS each of which holds 32K words and has a maximum access time of 8 nanoseconds.

The cache is organized so as to be four-way associative where the total cache size involves 32K words. The cache tag storage (FIGS. 2A and 3) is provided inside the cache controller chip 24 and the 32K words of cache data storage are provided by the 8 external data RAMS 16 (a, b, c, d, e, f, g, h).

The cache storage within the cache controller chip 24 is structured with four sets of 1024 lines of 8 total words. Each line is further divided into two blocks (or sub-lines) or 4 words each. Both of the sub-lines respond to the same address stored in the Tag RAM 54 (FIG. 3) in module 28 of FIG. 2A. However, each sub-line has its own independent "Valid" status bits. The correct sub-line is selected by an "Address-Upper" signal obtained from the address fields of the incoming cache requests. Cache misses operate on a single four-word sub-line at a time, depending on the state of the Valid status bits.

The Cache Controller Chip 24 operates on address and data supplied by the central processing unit 10 or else from data supplied by the bus interface unit (BIU) 15, (FIG. 1) and/or control signals supplied by the G-bus controller 14 (FIG. 1). The Cache Controller 24 also performs selected sub-line "Invalidate" operations on indicated lines received from a System Bus Spy Logic Unit 40. The bus interface unit 15 (FIG. 1) and the spy logic 40 provide the entire interface between the cache and the network's system busses 22A and 22B. The bus interface unit 15 is connected to the G-bus 12 which runs between the cache controller module 24, the central processing unit 10, the cache RAM 16 and the G-bus controller 14.

The G-bus controller 14 is made of a series of programmable logic devices (PLD) which look at control signals provided by the central processing unit 10, and from other parts of the processor board in order to generate control signals for the cache module 8. The cache module 8 will be seen to be made of the external state machine 30, the Cache Controller chip 24, the system bus spy logic 40 and other miscellaneous logic associated with the functions of the cache unit.

The System Bus Spy Logic Unit 40 sends the address (on bus 42) of a cache line to be "Invalidated" to the cache controller chip 24, wherever a system bus command is observed on the system bus (22A, 22B) that requires the local cache data to be invalidated.

The Cache Controller Chip 24 then performs an "Invalidate Cycle" on the indicated lines based on the state of the "Valid" status bits and any RAM HIT for the two sub-lines.

DESCRIPTION OF PREFERRED EMBODIMENT

The particular computer system involved is a Unisys architecture system designated as the A11 and uses a specialized protocol designated EMODE. The FIG. 2B indicates how the 32-bit EMODE address is mapped into the cache physical address. The address bit 31 is not used.

FIG. 2B shows the tag field of 18 bits and the index address of 10 bits.

The illustration indicates use of the "upper word" in Bank 2 and refers to Word 2. (2nd word of the 4 word packet.

Figure 2A:
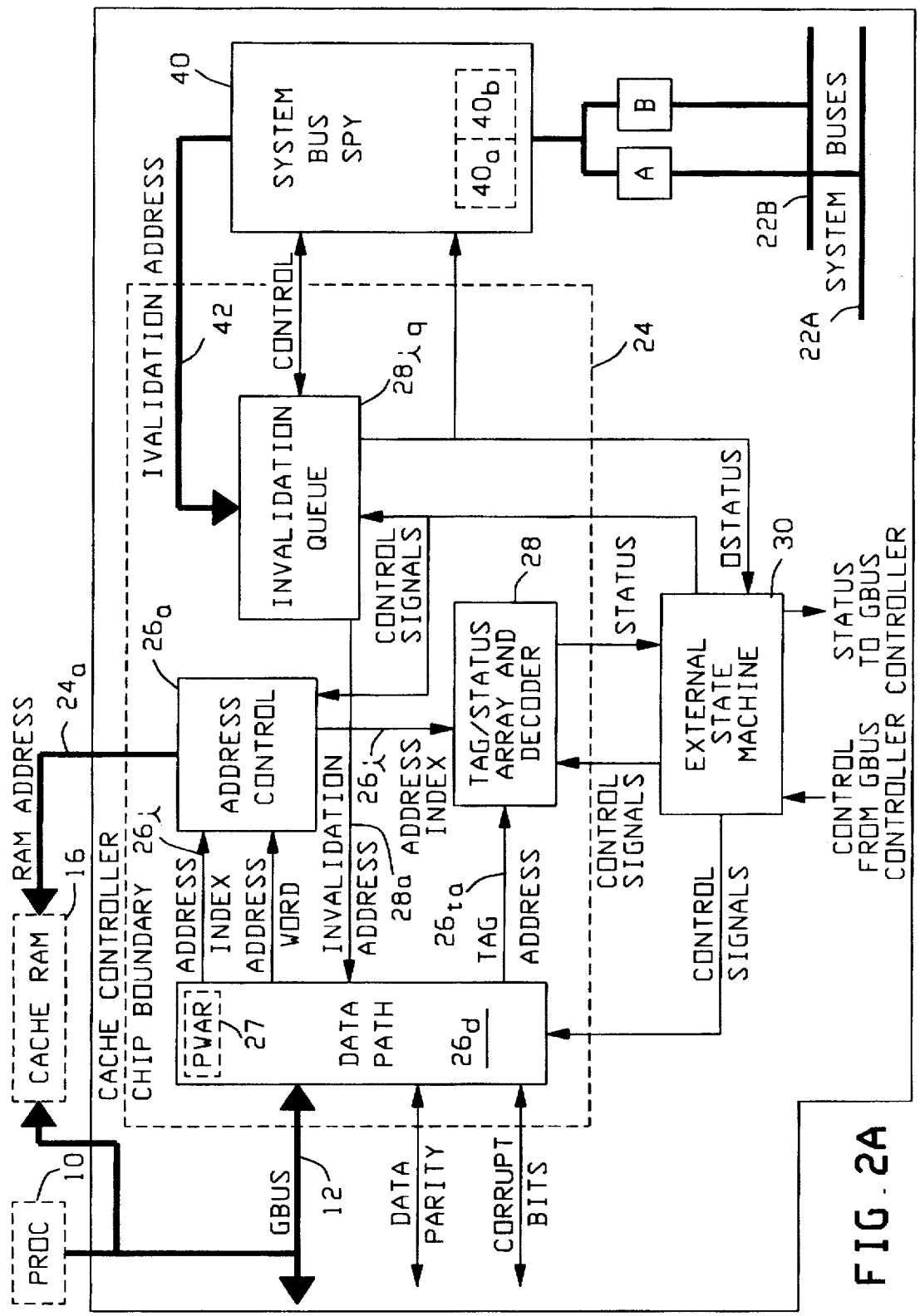
FIG. 2A is detailed block diagram of the cache controller unit which controls the operation of the cache memory modules.

FIG. 2A is a drawing of the Cache Controller Chip 24 which illustrates the functional sections involved within the chip. There are four main functional sections which are designated as the address control logic $26_a$, the Tag/Status Array and decoder 28, the Data Path Circuitry $26_d$ and the Invalidation Queue $28_{iq}$.

Additionally, there are provided two separate functional sections outside the cache controller chip and these include the external state machine 30 and the system bus spy logic 40.

Address Control Logic ($26a$, FIG. 2A):

The Address Control Logic $26a$ functions to generate addresses for use by the cache data RAM 16 (FIG. 1). Addresses may be received (FIG. 13) either from the GBUS 12 (via a processor command) or from the invalidation queue $28_{iq}$ (originating from the system busses 22A, 22B) or from the program word address register PWAR 27.

The selection of which address is to be used is made by the External State Machine 30, FIG. 2A. The selected address is then registered into the index register, the word register, and the upper bit registers, thus forming the index address, the word address, and the upper bit address. FIG. 2D indicates a drawing of the address fields of the cache RAM 16.

FIG. 2C shows the organization of the cache RAM being made up of four banks, 0, 1, 2, 3, each bank having 1024 cache line addresses with a selectable upper packet and lower packet.

The index address (FIG. 2C) is used to access the cache RAMs 16, the Tag/CAM RAMs 54 (FIG. 3) and the status RAMs 56, FIG. 3. On commands having an address, the index address comes from the GBUS register (INDEX-IN) and the index register is bypassed.

On Fetch code commands, the index address does not come from the GBUS path 12. In this situation, the external state machine 30 selects the program word address register 27 (FIG. 13) to provide the address. A similar address path also exists to provide the address during internal RAM testing. On invalidation cycles, the address is provided from the index register.

The word address (FIG. 2B) comes either from the word register or the word adder. When a four-word transfer is in process, the word address needs to be incremented in order to access all four words of the E-mode protocol. This happens when data is written into the cache RAMs 16 from the main system memory (MM), for example, on any miss operation. This incrementing function is performed by the word adder, the word FF and the word register in conjunction with the external state machine 30.

The upper address bit (bit 2, third bit, FIG. 2B) originates in the data path unit $26_d$, FIG. 2A, and is registered there. A registered signal is used to access the cache RAMs 16 and to determine if the upper bank or lower bank is being accessed in the tag/status block 56. FIG. 2C is a drawing indicating the upper bank and lower bank of the cache RAM 16.

The bank address is sent out to the cache RAMs 16 as it is received from the tag status block 56.

A state enable signal (STATEN-B) signal is used by the external state machine 30 to gate off the status clock. This clock is controlled in a particular manner to prevent corrupting the status RAM 56, FIG. 3.

The cache RAM address is always driven out by the address drivers. These signals are only guaranteed to contain proper information during the processing of a command, and specifically, when the cache RAM Write enable signal is active or the GBUS controller (GC) 14 activates the cache RAM output enable signal.

Instruction Processor Data Operations:

Functionally, it is assumed that every cache Address Index is valid and is therefore processed until the tag RAM logic displays a "miss." The index address is received from the GBUS register via a index address bypass multiplexer.

The address index (on bus $26i$, FIG. 2A) is driven to the tag/status array logic 28 for addressing the tag/status RAMs 56. If a "HIT" is detected by the tag/status RAMs 56 (FIG. 3), a registered address bank is generated and sent to the address control logic $26_a$ to form the complete cache RAM address. If a "miss" occurs, a bank address is randomly generated and is sent to the address control.

On a four-word data transfer, the word address must provide four sequential addresses in order to access the cache RAM 16. The address starts at the initial value loaded and is incremented by 1 until all four words have been transferred.

Depending on the type of operation, either the external state machine 30 activates the cache Write enable signal or the GBUS controller (GC) 14 activates the RAM output enable signal so that the valid cache RAM address may be used to access a location in the cache RAMs 16.

Fetch code operations by the instruction processor 10 are operations where the address generation for this operation is the same as the that for the instruction processor data operation except that the index address is not provided by the GBUS register. During a Fetch code operation, the external state machine 30, 13, selects the program word address register, PWAR instead.

Invalidation Queue Operations:

The address generation for this operation is the same as the instruction processor data operation except that the input to the index register is provided by the Invalidation Queue $28_{i_q}$ (FIG. 2 and FIG. 4) and the index register provides the index address.

Figure 13:
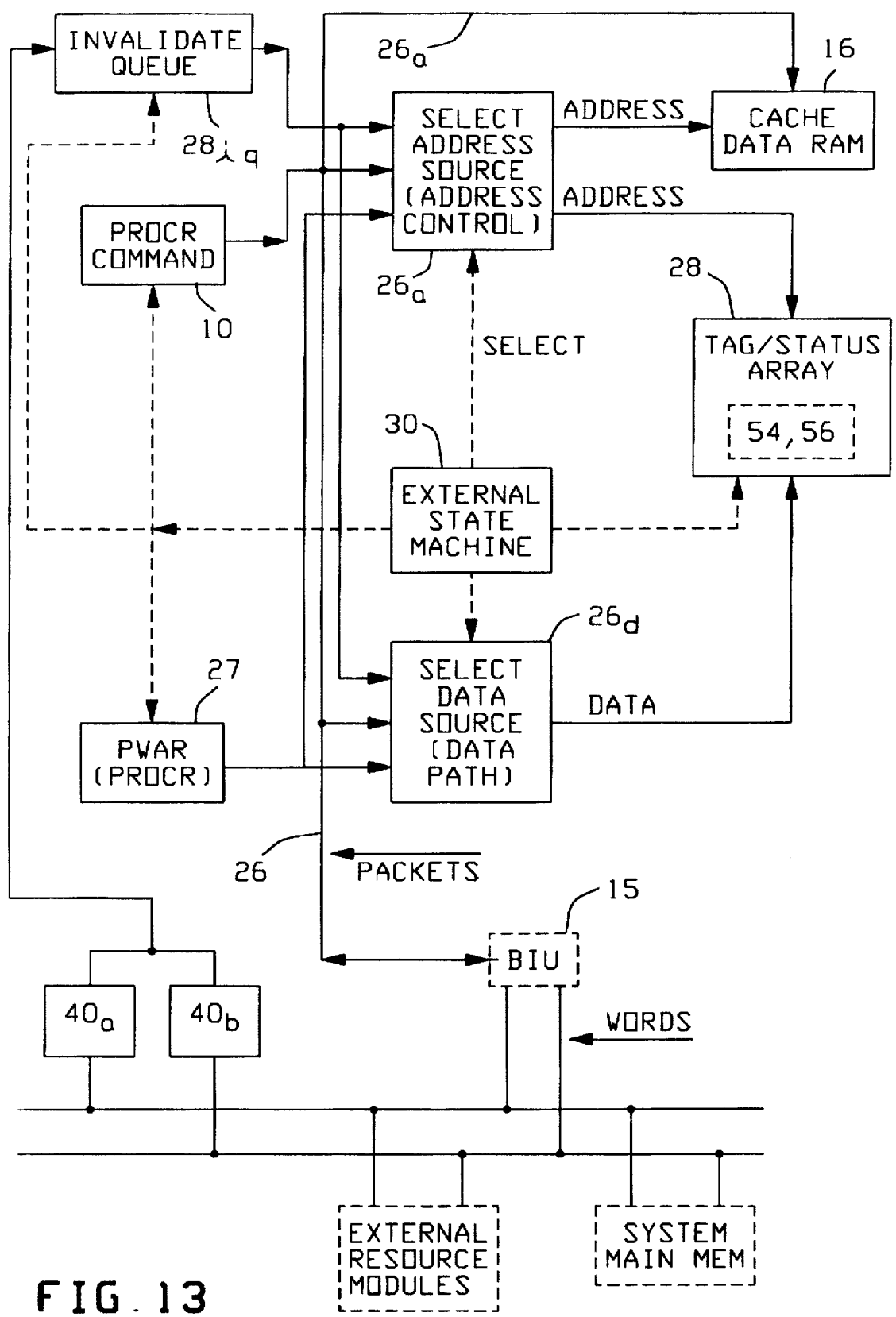
FIG. 13 is an abstracted view drawing showing how the system routes addresses and data to cache and to the tag/status array.

As was also seen in FIG. 13, the function of the address control logic $26_a$, (FIG. 2A) is to generate addresses for use by the cache RAM 16 and the internal RAMS ($16a,b,c,d,e,f,g,h$). The address control logic $26_a$ in FIG. 3, operates under the control of the external state machine 30. Addresses may be received either from: (i) the G-bus 12 (from a processor 10 command), or (ii) from the invalidation queue $28_{i_q}$ which originated from the system busses (22A, 22B) or (iii) from the program word address register (PWAR) located within the data path module $26_d$, FIG. 2A.

The address (FIG. 2B) which is driven to the cache RAMS 16 is made of four different fields. These fields consist of (i) or 18 bit Tag field a 10-bit Address Index; (iii) single bit for Address Word; (iv) two bits for selecting one word of the 4-word packet.

The 10-bit Address Index (operating to select the Tag RAM Index) is selected from one of three possible paths shown in FIG. 13 as:

(a) The Address Index Register: This register is sourced by the Invalidation Queue Logic $28_{i_q}$ to provide "Invalidate" operations.

(b) Instruction Processor 10 data operations will receive their index address by the G-bus 12 through the data path $26_d$ of FIG. 2A.

(c) The Program Word Address Register 27 (PWAR), FIG. 2A for "Fetch code" operations.

The Address Bank (FIG. 2B) is sourced by the Tag/Status Array Logic 28. The initial Address Word and the Upper/Lower Address are sourced by the data path unit $26_d$ and then registered inside the Address Control Logic $26_a$, FIG. 2A.

A Word Counter registers the Address Word. The Address Word (FIG. 2D), 2E is incremented by the Word Counter in order that four word blocks of code or data may be addressed on the same cycle.

Tag/Status Array and Decoder 28 (FIGS. 2A, 3):

The Tag/Status Array and Decoder Logic 28 is the logic which determines if the data requested resides in the cache RAM 16. The Tag-Control Logic 28 stores the status information which is used to preserve data coherency. This Array-Control Block 28, as seen in FIG. 3, is made up of Decode CAM Tag RAMS, Status RAMS, Control Logic, a Bank Selection Mechanism and a Tag/Status Parity Checker. These elements are shown in FIG. 3 which provides an architectural diagram of the Tag/Status Array and Control Logic 28.

The tag/status array-control block provides a number of functions which: (a) stores the tag address and stores the status and parity information for that address; (b) compares an incoming tag address with the stored address at that index to determine a "HIT"; (c) qualifies a "HIT" as valid by error checking and examining the status bits; (d) provides the bank address when there is a "HIT" and selects the bank for replacement when there is a "miss"; (e) provides new values for the valid bits and the status/tag parity for a status update; (f) generates an odd parity for the tag address and status bits which will be stored in the tag/status array.

The tag/status array decoder control block 28 is composed, as seen in FIG. 3, of a (i) memory structure to store tag addresses, status and parity bits; (ii) parity generation logic; (iii) bank selection logic; (iv) the tag/status parity check logic; (v) the control logic.

The tag/search decode logic 52, FIG. 3, performs three functions. It determines if a valid "HIT" has occurred and determines if there is a multiple "HIT" error. The decode logic 52 (FIG. 3) also generates new values for the valid bits for a status bit update.

The cache controller 24, FIG. 2A, has one basic mode of operation, that is to say, it determines if the data requested resides in the cache RAM 16. The request may come from the processor 10 or via the system busses (22A, 22B) as in the case of an invalidation cycle. The actual source of the request does not affect the functionality of the cache controller.

As seen in FIG. 3, there are a series of decode CAM tag RAMS 54 (0, 1, 2, 3,). A portion of the system main memory address bits called the "tag" is stored (along with data) in the cache. The stored tag is compared against the processors memory address or an internal address register to determine if the cache RAM 16 contains the required data.

The memory structure storing the address tags is the Content Addressable Memory (CAM) 54 (FIG. 3). The CAM tag RAM 54 is logically arranged in four columns or banks, each bank being 18-bits wide and 1024 locations deep. Each of the four CAMs have a data-in port, a Write enable port, a Data out port, an Address port, and a Hit port.

All four of the CAMs 54 (0, 1, 2, 3,) have their address provided by a 10-bit Address Index and an 18-bit Address tag FIGS. 2B, which is the data-in signal for all four CAMs. The address tag stored in the CAM will map into the cache RAM 16, FIG. 1.

The source of the Address Tag is a tag bypass multiplexer $55_p$, FIG. 3. This multiplexer is used to speed up the address path bypassing the data being loaded into the Tag Register around the register. Once the tag register is loaded, the address comes from the register. However, the External State Machine 30 determines the source.

The CAM 54 compares the address tag stored at the address index with the data-in address tag from the data path block $26_d$. If there is a match, then the CAM issues a "HIT" signal. The "HIT" signals from all four banks are used by the decode logic 52 to determine the bank address to send to the data RAM array 16 to qualify the "valid HIT" signal.

The Write enable signal (from 54e, FIG. 3) for each CAM 54 is controlled by the bank selection logic and the external state machine 30. The bank selection logic determines which of the four banks can be written to. The external state machine 30 also determines when each bank should be written to by activating its tag CAM Write enable signal.

Status Ram 56 (FIG. 3):

The Status RAM stores the status information associated with the address tags in the CAM 54. The Status RAM consists of four 256×36 RAMS in order to make 1024 locations. Each Status RAM entry contains a set of two valid bits, and three odd parity bits for all four tag banks which will total 20 bits of status information at each location.

To preserve data coherency, status bits are stored which are associated with the stored address tags which indirectly map to the data. The status bits are "valid upper" and also "valid lower." The data which maps to a particular tag address is a copy and either is valid or invalid. The status bits are used to implement certain rules for data coherency.

In the status RAM 56 of FIG. 3, the memory structure which stores the status and parity bits is a RAM system. It consists of four 256×36 RAMs making 1024 locations. The four RAM cells each have a port for: data-in; Write enable;

output enable; and data out; and an address port. All four of the status RAMs have their address provided by the 10-bit Address Index, FIG. 2B.

The Write enable for the four RAMs 56 is controlled by the external state machine 30 indirectly. The state machine 30 determines on what condition a Write should occur (a HIT or a miss) and the Tag/Search Decode logic 52 makes a decision to Write. The status and parity information for all four banks is written into the RAM 56 during each Write, even though the status changes for only one bank.

Decode CAM Tag RAM (54), FIG. 3:

The memory structure for storing address tags is a content addressable memory, CAM Group 54. The Decode CAM Tag RAM 54 (0, 1, 2, 3) is logically arranged as seen in FIG. 3, in four columns or banks, each bank being 18 bits wide and 1024 locations deep. Each bank entry contains an 18-bit address tag. The address tags stored into RAM indirectly map into the Data Array Cache RAM 16 via the bank address generated from whichever bank has had a "Valid" HIT. A Write-Enable Logic Unit $54_e$ is associated with each logical column or bank. The CAM 54 compares the contents of the address tag of the address set with the address tag input via bus 56x, from the Data Path Block $26_d$ (FIG. 2A).

If there is a match, then a HIT signal for that bank is generated. The internal HIT signal for all four banks are used by the decode logic 52 and bank select logic 57 to determine the bank address to send to the Cache RAM 16 and to qualify the VALID HIT signal 52a. This signal is seen as an output from the decode logic 52 of FIG. 3.

Tag/Search Decode Logic 52 (FIG. 3):

The Decode Logic 52 in FIG. 3 generates the VALID HIT signal which indicates that the Cache 16 contains the data requested. A VALID HIT is determined by the presence of a comparator match, the valid bit being set for the Upper/Lower Address pointed to by the Upper Address bit. The Tag/Search Decode Logic 52 produces the signals which indicate a parity error for the tag and status bits which are outputted from the RAMs 54, 56. The Decode Logic also generates a multiple HIT error, signal indicating that valid data is stored in more than one Cache RAM Bank 16.

Additionally, the Decode Logic 52 updates the valid bits to be stored in the Status RAM 56, depending upon the command present and the last values of the status bits. During an invalidation request status update, the external state machine 30 provides a signal to indicate when the valid bits must be turned off.

Bank Selection Logic 57 (FIG. 3):

The 2-bit Bank Address is used to form the Cache RAM Address and is determined by this particular block. If a valid HIT has occurred, then the Bank Address corresponds to the bank having the "HIT". If a "miss" occurs, then a bank must be selected for replacement using a pseudo-random generator. During the tag search, both the upper and lower valid bits of each addressed set are checked.

Tag/Status Parity Checker 58 (FIG. 3):

The data stored in the Status RAM 56 includes three parity bits. The bits establish odd parity for three segments, two 8-bit segments form from the first 16 bits of the address tag and a 4-bit segment formed from the two valid status bits and the two most significant bits of the address tag. Data out from the Status RAM 56 and the CAM 54 column is input to the Tag Parity Check Circuit 58 (0, 1, 2, 3). A Parity Check Circuit 58 exists for each column. The odd parity will be verified during the data access. If a parity error is discovered for either the stored tag address or the status bits, then an error signal will be sent to the G-Bus Controller 14 of FIG. 1.

Other Logic:

The update status logic circuitry 55 (FIG. 3) works to update the status RAM 56 to set the status value of the particular bank ($54_{0,1,2,3}$) that was selected on a particular cycle.

The status register multiplexer circuit 53 (FIG. 3) enables the selected bank ($54_{0,1,2,3}$) to be overwritten to indicate its updated status.

Program Word Address Register 27 (FIG. 2A):

The program word address register (PWAR) 27 is used to store the program word address on Fetch code operations. The 32-bit wide PWAR register loads, holds, and increments code addresses. The load and increment signals are provided by the GBUS controller 14 (GC). The Hold signal is generated internally when not loading or incrementing.

The PWAR input receives 32 bits from a 4-1 GBUS source multiplexer. In actuality, the PWAR uses only the data derived from the GBUS bypass multiplexer as input data when it is being loaded. The output of the PWAR consists of 32 bits which is split into sub fields to form addresses for other modules.

The Address Index portion does not pass through the address data multiplexer. It is stripped off from the PWAR output and connected straight to the address index multiplexers in the address control logic. Bits (1:0) of the PWAR output, represent the address word connecting to the address control logic, while bit 2 is the upper/lower address going to the address control logic and the tag RAM control logic. The most significant bits represent the address tag and they are sent to the tag/status array logic of FIG. 3.

During a Read code operation, the PWAR 27 is loaded with a code address from the instruction processor 10. Once the Read code operation has completed, the value held in the PWAR 27 is incremented by "1." The incremented address value is held in the PWAR until the new code operation is initiated. At that time the incremented address is used as the address for the Fetch code or the Read Next code cycle. If the code operation is a Fetch code or a Read Next code operation, the PWAR address is used and the PWAR is incremented at the completion of the operator (OP). If the operation is a Read code, PWAR is loaded as previously discussed.

In the Fetch code cycle, the various required address fields are derived from the PWAR output. These are sent to other logic units, to address a cache RAM code word. The code word is read off the GBUS.

Data Path Module $26_d$ (FIG. 2A):

The Data Path Module provides logic for interfacing the G-bus 12, the Invalidation Address Bus 42, and the Program Word Address Register 27 address with the internal Address Control of Tag/Status Array Logic 28.

The Data Path Module Logic $26_d$ drives the G-bus 12 and also receives data on the G-bus 12. Data Path Logic $26_d$ also drives and receives external data parity bits and corrupt bits. Within the data path logic module $26_d$ there is included:

(a) Associated Multiplex Logic to route data to/from various locations.
(b) Tag bits equal to three check logic. (The four most significant data bits of the 52 bit GBUS 12 contain the Tag Bits. These bits are checked by E-Mode Tag-Check logic for a constant of "3" any time that data is put on the GBUS 12. If a value of "3" is not detected, then an error signal will be set).
(c) Data parity generation and check logic.
(d) Program Word Address Register.
(e) Corrupt generation and check logic.
(f) Write Buffer Register (WRBUF).

The Data Path Module Logic $26_d$ supplies the address index on line $26_i$ to the address control logic $26_a$ of array 28 of FIG. 2A. The data path module $26_d$ also supplies the Tag Address via bus $26ta$ to the Tag Status Array Logic 28. The Data Path Logic $26_d$ additionally receives invalidation addressees from the invalidation queue $28_{iq}$ on line $28_a$ of FIG. 2A.

The Data path Logic $26_d$ accepts a large number of control signals that are used as multiplexer selects, load and increment register signals, check parity signals, and input/output driver selects. For the variously different operations involved, these control signals are activated by either the G-bus controller 14 or the external state machine 30.

The data path logic module $26_d$ is the central receiving and distribution point for the majority of communication lines in the cache control chip 24. For example, information is received from the GBUS 12, and portions of the bus are split off to form different address fields which are sent to other submodules. In addition, different GBUS sources can be selected in order to drive the GBUS 12. These sources may be other submodules or paths within the data path module. The data path control factors of the data path module 26d are controlled by the external state machine 30.

The data path logic module 26d of the cache controller 24 is made up of several functional units. One set of units is the INPUT/OUTPUT drivers for: (a) the GBUS 12; (b) for data parity bits; and (c) the cache RAM 16 corrupt bits.

The data path logic also has several multiplexers which include (i) an address multiplexer; (ii) a GBUS multiplexer; (iii) a data output multiplexer; and (iv) a test output multiplexer.

The data path logic module $26_d$ also has several functional units which include: (a) an E-MODE Tag checker; (b) odd parity generator and checker for both data and code; (c) a program word address register PWAR 27; and (d) a data corrupt bit generator and check logic. The data path logic module 26d includes a number of registers which include: (i) a write Buffer register for storage of incoming data; (ii) a program word address register for storage of code word addresses; and (iii) a GBUS register that loads off of the GBUS 12.

Invalidation Queue 28iq (FIG. 2A):

The Invalidation Queue receives addresses, on bus lines 42, of lines to be invalidated from the system bus spy logic 40 and supplies those addresses via bus 28a to the data path unit module 26d in order that they can be routed to the Tag/Status Array Module 28 of FIG. 2A. The invalidation queue $28_{iq}$ of FIG. 4 includes an actual invalidation queue address storage unit and all the logic needed to control the invalidation queue operation. The execution, however, of actual invalidation operations is controlled by the external state machine 30 of FIG. 2.

Cache Controller External State Machine 30 (FIG. 2A):

The cache controller state machine (CCSM) functions to coordinate cache operations. The state machine 30 must handle the cache's GBUS interface 12, control the selection of the "tag search" address source, sequence the tag search logic, then define the update conditions for a cache operation, control the clocking of the status RAM 56 and maintain the operations of the invalidation queue $28_{iq}$.

Figure 5:
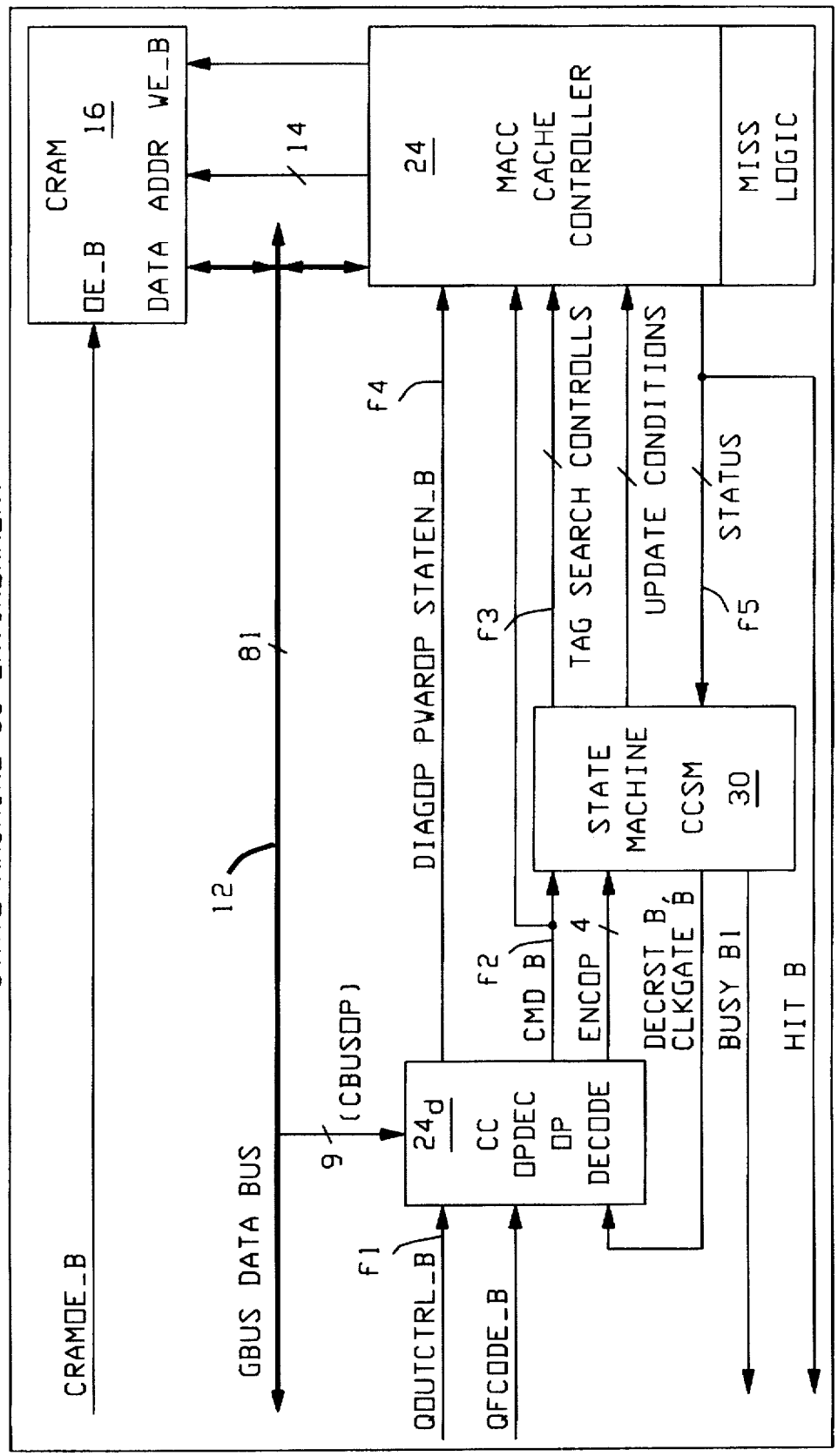
FIG. 5 is a block diagram of the external state machine and its environment.

FIG. 5 is block diagram of the environment of the cache controller external state machine 30. Cache operations consist of a tag search for one of three E-mode address sources followed by possible cache state modifications depending on the type of operation and the result of the tag search. The address sources as well as the potential cache state modifications vary depending on the cache operations. Cache operations can be initiated by the processor 10 or via the invalidation queue $28_{iq}$. FIG. 13 shows a simplified drawing of the address and data sources involved.

Each cache operation must be sequenced in such a manner as to maintain the protocol of all of the involved logic blocks without violating any device's timing restrictions and also while minimizing cache overhead period, processor lockout periods and system bus "retry operations." The cache controller state machine directly or indirectly controls all of these functions.

The relationship between the cache controller 24 (FIG. 1) and its operations decoder $24_d$, FIG. 5, to the cache external controller state machine 30 and the cache data RAM 16 is shown in FIG. 5. The operations decoder $24_d$ is a logical extension of the state machine 30. The external state machine 30 connects to the GBUS interface on bus $12_d$ with the GBUS data bus 12 and several control signals. The external state machine 30 also connects to the cache controller 24 and certain miscellaneous logic which can be considered as one block which then connects to the cache data RAM 16.

The External State Machine 30 of FIGS. 1, 2A and five works in conjunction with the G-bus controller 14 in order to coordinate cache RAM 16 data accesses, also to coordinate the cache controller 24 and to synchronize itself with external events, such as data transfers done with the bus interface unit 15 (BIU).

The G-bus controller 14 provides the cache request, and then the external state machine 30 orchestratee the operation within the cache module 8, FIG. 1.

One exception to this is the invalidation cycle. The external state machine 30 detects that the invalidation queue $28_{iq}$ is "not empty" and then processes the invalidation addresses quite invisible to the G-bus controller 14.

If the G-bus controller 14 makes a cache request while the cache is trying to start an invalidation request, this invalidation cycle is aborted and the G-bus 12 request is accepted. Thus, priority is given to a "cache request" over a request for an invalidation cycle. Once the cache module goes busy, however, due to the invalidation request, then the G-bus 12 cache request must wait until the cache module is free to handle its request.

The external state machine 30 can execute four basic types of cache operations as follows:
 (i) Processor 10 Memory requests.
 (ii) Processor 10 Fetch Code requests.
 (iii) Invalidation cycles using addresses queued in $28_{iq}$.
 (iv) Processor 10 Cache diagnostic requests.

Processor memory requests are, of course, initiated by the processor 10. These requests consist of the basic memory Read and memory Write commands, as well as commands that do both.

When the signal GC-QOUTCTRL-B (line $f_1$, FIG. 5; line $12_d$, FIG. 1) is active, it indicates that the processor 10 is making a cache request. The EMODE address is supplied by the processor 10 as well as the operation code by means of the G-bus 12.

Processor Fetch code requests are initiated by the processor hardware 10 when space is available in its code buffer in the processor module 10. When the signal GC-QFETCH-B is active, it indicates that the processor 10 is making a Fetch code request. In response of this request, the cache controller 24 fetches the request code word and gives it to the processor 10. The EMODE address is supplied by the cache controller's internal program word address register (PWAR) counter and this operation is always designated "Fetch Code."

Invalidation cycles are handled within the cache module 8 of FIG. 1. The invalidation EMODE address or addresses are sent to the invalidation queue $28_{iq}$, FIG. 2A, when the system bus spy 40 detects a request on the system bus (22A, 22B) that requests an update of a word of data or otherwise, for some other reason, causes that EMODE address to be invalidating. This invalidation cycle is required to keep all copies of data in synchronized coherency with the new updated master data in main memory. Thus, by invalidating old data, there will be no conflict with the updated master data in main memory.

Cache diagnostic requests are special processor commands implemented to provide a means to test and monitor the cache data RAMS 16, the cache controller Tag/Status RAMS 54, (FIG. 3) and the cache controller invalidation queue $28_{iq}$ of FIG. 2A. In the cache controller module 24, these commands allow Read/Write access to the tag/status RAMS 54, FIG. 3, and will only read access to the invalidation queue $28_{iq}$ via the processor microcode. Using this as a means of access, the processor 10 can test these structures by using a specially written diagnostic microcode test.

The external state machine 30 starts an operation from an idle state where it is waiting to receive a request. As an example, if it is assumed that the request is a "Read", then once a request has been received, the state machine 30 then proceeds to a "search state" wherein a tag search is initiated. On a Read, state machine 30 then accesses the cache RAM 16 as if it has the requested data and waits until the tag search is complete. If the tag search is a HIT, the access data is taken by the processor 10 and the state machine goes back into an idle state.

If a "Read Miss" is detected after the tag search, the external state machine 30 enters a "fill" state where it waits for the first requested data word. Once this word has been received, it is given to the processor 10 and the state machine 30 then waits for the next three data words. Once the last word is received, the status tags are updated and the state machine returned to its idle state.

On a "Write" operation, the external state machine 30 accesses the cache RAM 16 as if it has the requested data and waits until the tag search is completed. If the tag search is "HIT," the addressed data word is updated and the updated data is also sent to the system bus (22A, 22B) to cause any existing copies in other cache modules to be invalidated.

If a "Write Miss" is detected after the tag search, the external state machine 30 goes back to its idle state. The bus interface unit 15 will read the data directly from system main memory without affecting the state of the cache.

System Bus Spy 40 (FIG. 1):

The logic of the system bus spy has the function of monitoring the system busses (22A, 22B) for memory requests that reference addresses of data that may presently be stored in the cache RAM 16. This monitoring is performed by spying on the system bus for commands that cause data words to be updated. When such a command is detected, the address of this command is sent to the Invalidation Queue $28_{iq}$. This invalidation address will be used for an invalidation cycle to be initiated and executed by the external state machine 30.

The spy logic will not write into the invalidation queue if the queue is full. In the situation of the invalidation queue being "full," all operations on the system bus which would have needed its address to be written into the invalidation queue will then have to be later "re-tryed" until the "full" condition goes away. The queue "full threshold level" is a programmable condition which can be programmed by the cache controller 24.

The spy logic 40 has two internal state machines $40_a$, $40_b$, enabling it to monitor each one of system busses 22A and 22B.

Figure 4:
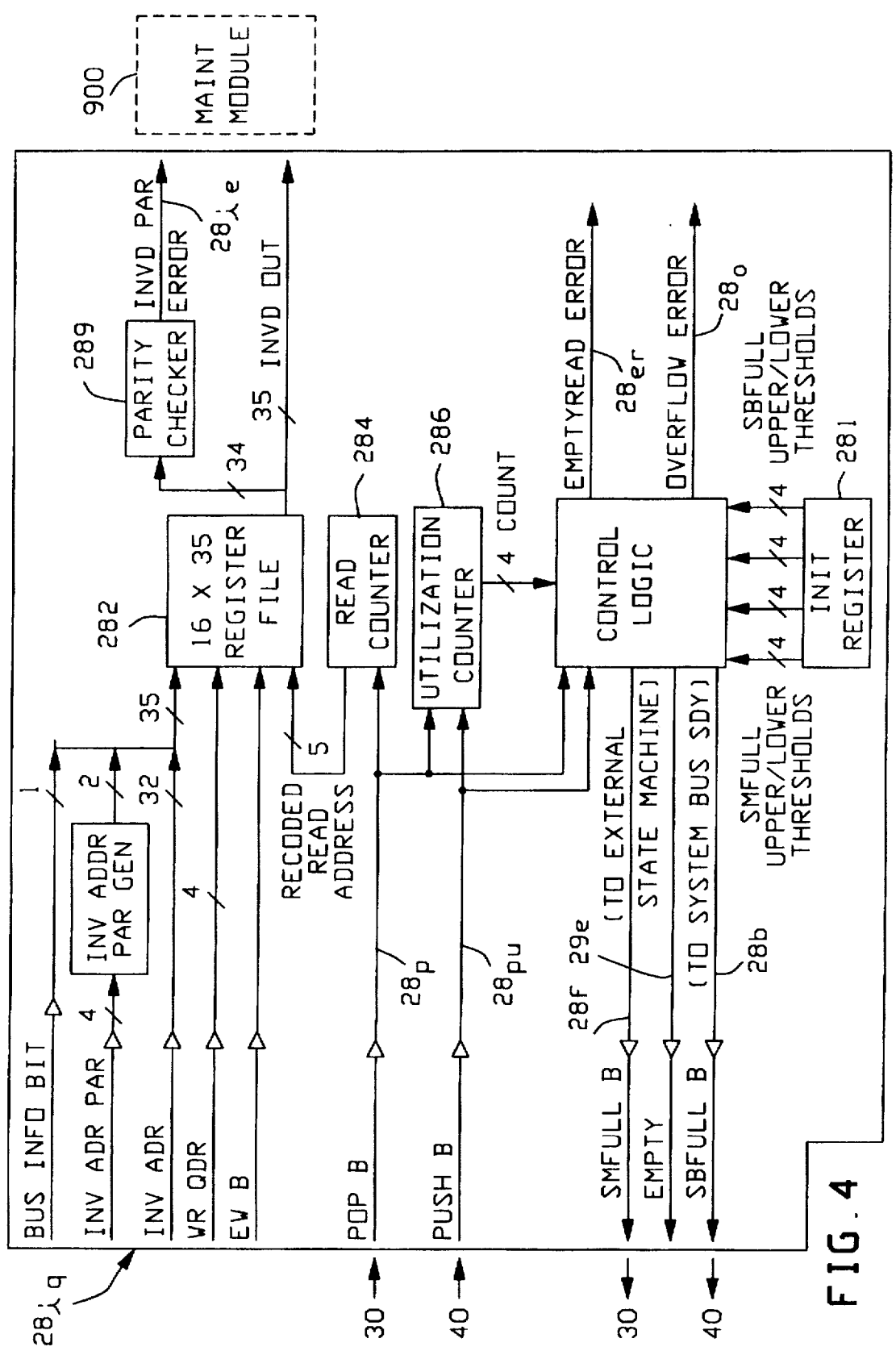
FIG. 4 is a block diagram of the invalidation queue module.

The primary function of the system bus spy 40 is to monitor system busses 22A, 22B for "invalidation type ops" and then send E-mode addresses that require invalidation over to the invalidation queue module $28_{iq}$. This is accomplished by the internal state machines $40_a$ and $40_b$. The system bus spy module 40 also generates and sends Write addresses and a Write enable signals to the invalidation queue $28_{iq}$ and also sends the signal on line $28_{pu}$ designated PUSH-B to increment the queue utilization counter 286 as seen in FIG. 4.

The system bus operators (OPs) that require an address to be invalidated in the cache controller chip 24 are as follows: (i) Private Read; (ii) Write; (iii) New Data Overwrite; and (iv) Read Lock. When the internal state machines $40_a$, $40_b$ detect an invalidation operator (OP) on a system bus 22A, or 22B, they take and hold the system bus spy registers containing the E-mode address and parity.

As seen in FIG. 1, each system bus 22A, 22B has its own internal state machines $40_a$, $40_b$, and a set of registers A, B, dedicated to it. As the internal state machine spy sends invalidation data to the invalidation queue $28_{iq}$, it simultaneously outputs a drive clock signal (DRVCLK) which increments the 4-bit Write address counter, generates a Write enable pulse, generates an output enable signal for the system bus spy registers and generates the PUSH-B signal on line $28_{pu}$, FIG. 4.

However, the Write address counter is not incremented nor is the PUSH-B signal generated if there is a RETRY or a BUSERR signal of that invalidation operator.

Since each system bus has its own internal spy state machine 40a, 40b, there is a drive clock A signal (DRVCLKA) and a drive clock B signal (DRVCLKB). In the case where the drive clock A and the drive clock B signals are active on the same clock, this is indicated to the internal spy state machine by the DRVNGA signal being active. The internal state machine specially handles it so that the write address counter is incremented twice and the PUSH-B is active for two clocks.

This case occurs due to either consecutive command valid, CMDVAL-B signals or the bus "not being ready" indicated by the NRDY signal. When active, the NRDY signal causes the internal state machine to transition to different wait states. This is indicated on FIG. 6. If the "full" signal from the invalidation queue $28_{iq}$ is active when an invalidation op comes across the system bus, 22A, 22B, the internal state machine will "retry" the bus and wait in "idle" for another command. No drive clock DRVCLK signal is output in this case. The internal state machine will continue to do this until the "full" signal goes "inactive" meaning that the invalidation queue $28_{iq}$ is ready to receive addresses again.

The system bus spy 40 includes synchronization logic to synchronize various 16 MHz and 32 MHz signals. The system bus spy logic runs at 16 MHz but includes a 32 MHz programmable array logic unit to synchronize the PUSH-B (FIG. 4) signal before it is sent to the invalidation queue $28_{iq}$.

Although the invalidation queue $28_{iq}$ runs at 32 MHz, the register file which stores the invalidation address and data is clocked at a 16 MHz rate. Thus the address and the data are not synchronized to 32 MHz. The system bus spy module 40 also receives 32 MHz signals which are synchronized back to 16 MHz. These signals include the "full" signal from the invalidation queue and a force signal from the external state machine 30.

Figure 6:
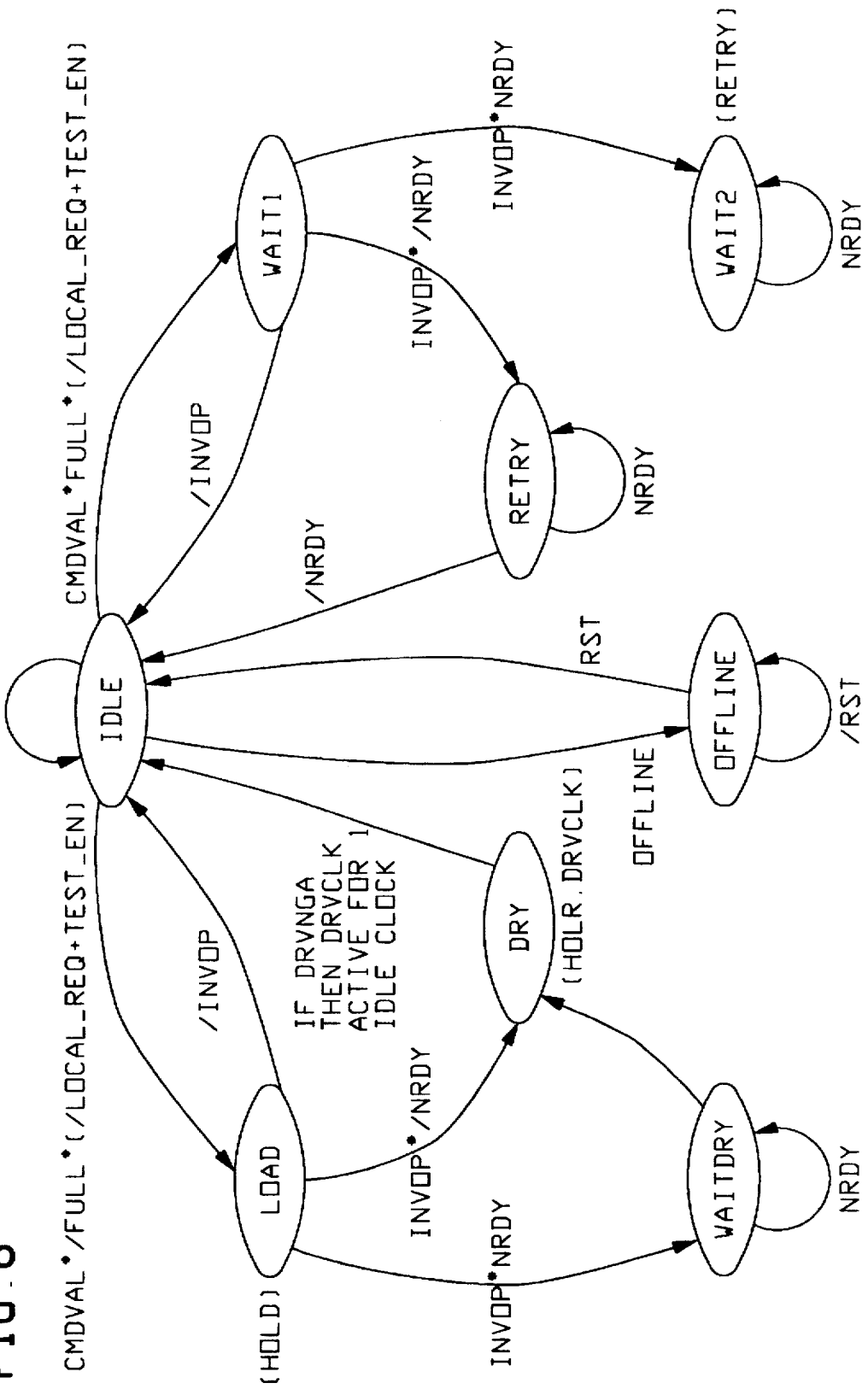
FIG. 6 is a state diagram of the operation functions of each of the two state machines operating in the system bus spy module.

The diagram of FIG. 6 indicates the various actions that are encompassed by the internal spy state machines $40_a$ and $40_b$ of FIG. 1 in the System Bus Spy Module 40.

Invalidation Queue $28_{iq}$ (FIGS. 2A, 4):

FIG. 4 is more detailed diagram of the invalidation queue. The purpose of the invalidation queue $28_{iq}$ is to handle the "invalidation addresses," that are sent from the system busses 22A, 22B. This accomplished by storing the invalidation addresses and managing the status of the queue.

The invalidation queue provides storage for invalidation addresses. To store addresses received, the Invalidation Queue $28_{iq}$ contains two register files 282 making up a 16 location queue. At each location (35 bits) there is stored a 32-bit E-mode address, two bits of parity and one bus information bit. The two parity bits, (one bit for the lower two bytes of the address and one bit for the upper two bytes) establish odd parity and are generated from the four bit-parity bits accompanying the address. The purpose of the bus information bit is to indicate which system bus (22A, 22B) the invalidation address originated from. This bit is a "0" to indicate system bus 22A and a "1" to indicate system bus 22B. When each queue location is to be written, the Write pointer and the Write enable pulse both accompany the invalidation address sent from the system bus spy 40, FIG. 2A.

It is necessary to provide for management of the queue status in the invalidation queue $28_{iq}$. The invalidation queue "status" is based upon when the queue is "empty" or is "full." This status is given both to the external state machine 30 and the system bus spy 40. A four-bit counter 286, FIG. 4, keeps a count of the number of invalidations that are present in the queue and pending execution by the external state machine 30. This counter 286 is incremented when it receives the Push-B signal on line $28_{pu}$ from the system bus 540 and is decremented when it receives the POP-B signal $28_p$ from the external state machine 30. When the utilization counter 286 is at "0," the invalidation queue outputs an "empty" status at line $29_e$.

The invalidation queue $28_{iq}$ also outputs two separate "full status" signals. One signal $28_f$ is issued to the external state machine 30 telling it that the invalidation queue needs immediate attention and must be "emptied."

The other signal $28_b$ is issued to the system bus spy module 40 telling it that the invalidation queue $28_{iq}$ is "full" and to begin "retrying" any invalidation type OPs that come across the system bus (22A, 22B). Each "full" condition will activate when the number of invalidation addresses pending in the queue is equal to its upper threshold level.

When the number of invalidation addresses pending in the queue is equal to its lower threshold level, the "full" signal will deactivate. Each signal has its own software programmable upper and lower threshold levels which can be adjusted according to system requirements.

When the queue is both "not empty" and also "not full," it is an indicator to the external state machine 30 that there are pending invalidations that need to be executed. When the external state machine 30 is reading invalidation addresses from the queue $28_{iq}$, the Read pointer for the queue is managed by a four-bit Read counter 284 that outputs the decoded Read address to the register files 282. The Read counter 284 is incremented by the POP-B signal $28_p$ sent from the external state machine 30.

In the operation of this system, there can occur errors in the invalidation queue. The invalidation queue $28_{iq}$ has an error detection system 288, 289 for several fatal errors to the cache. These errors include: (i) invalidation parity error on line $28_{ie}$; (ii) an empty-Read error line $28_{er}$; (iii) and a Queue overflow error on line $28_o$. (FIG. 4)

When an invalidation address is read out from the invalidation queue $28_{iq}$, a check is made for correct parity. A parity error detected in the invalidation address generates an invalidation parity error signal which is then issued to the maintenance module 900, FIG. 4. The invalidation parity error signal is shown on line $28_{ie}$ of FIG. 4. An empty-Read error is shown on line $28_{er}$ and this occurs when the invalidation queue receives the POP-B signal on line $28_p$ from the external state machine 30 while the queue is "empty." When this event is detected, the empty-Read error signal is activated and issued to the maintenance module 900.

When the invalidation queue $28_{iq}$ hits its "full" upper threshold level, then it is possible for up to two or more invalidation addresses to enter the invalidation queue before the system bus spy 40 (40a, 40b) stops sending them over. Thus, the full upper threshold value is always set to a value lower than 16 since that is the maximum capacity of the addresses in the queue. If the queue contains 16 invalidation addresses, and the system bus spy 40 sends a PUSH-B signal on line $28_{pu}$, then an "overflow error" signal $28_o$ will be generated and issued to the maintenance module 900.

Figure 7:
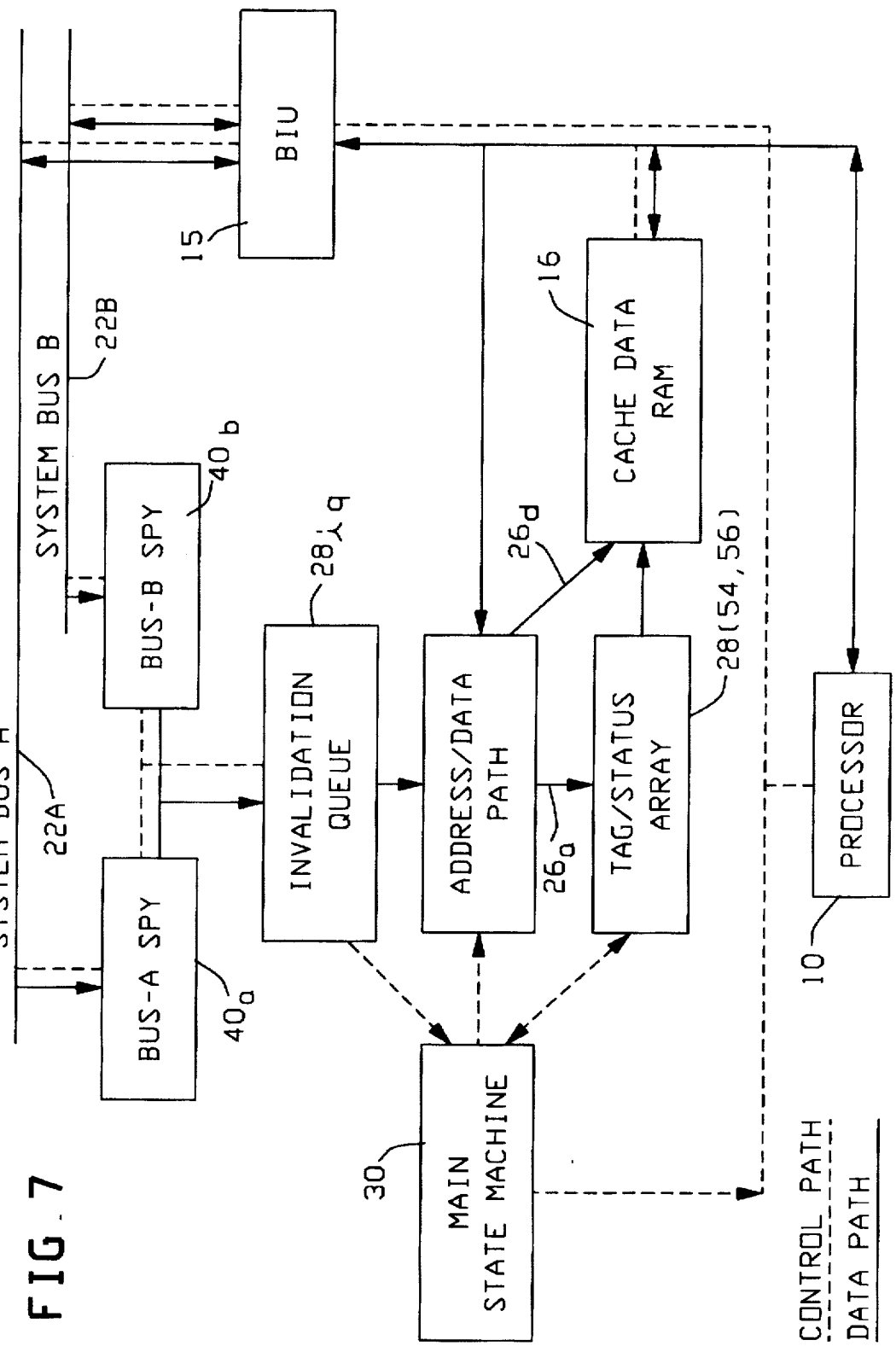
FIG. 7 is a drawing of the submodules communicating with the Tag/Status Array and Cache Data RAM.

FIG. 7 is a drawing illustrating the submodules communicating with the tag/status array 28 and the cache data RAM 16.

As seen in FIG. 7, the system busses 22A and 22B are monitored by the spy modules internal state machines $40_a$ and $40_b$ respectively. New data to be overwritten is sensed from the system busses and the addresses passed on to the invalidation queue $28_{iq}$. The address/data path is provided for by the path element $26_a$, seen in FIG. 13, which provides data to the cache data RAM 16 and provides addresses via $26_a$ to the tag status array 28, having the internal elements 54 and 56.

The bus interface unit 15 provides a data channel to "fill" the cache data RAM 16 from the system main memory (system RAM) when necessary. Likewise, Bus Interface Unit, BIU 15, can provide data to the address/data path 26 and also to the main processor 10.

The external state machine 30 provides control functions to various of the modules as shown by the dashed line in FIG. 7.

Figure 8:
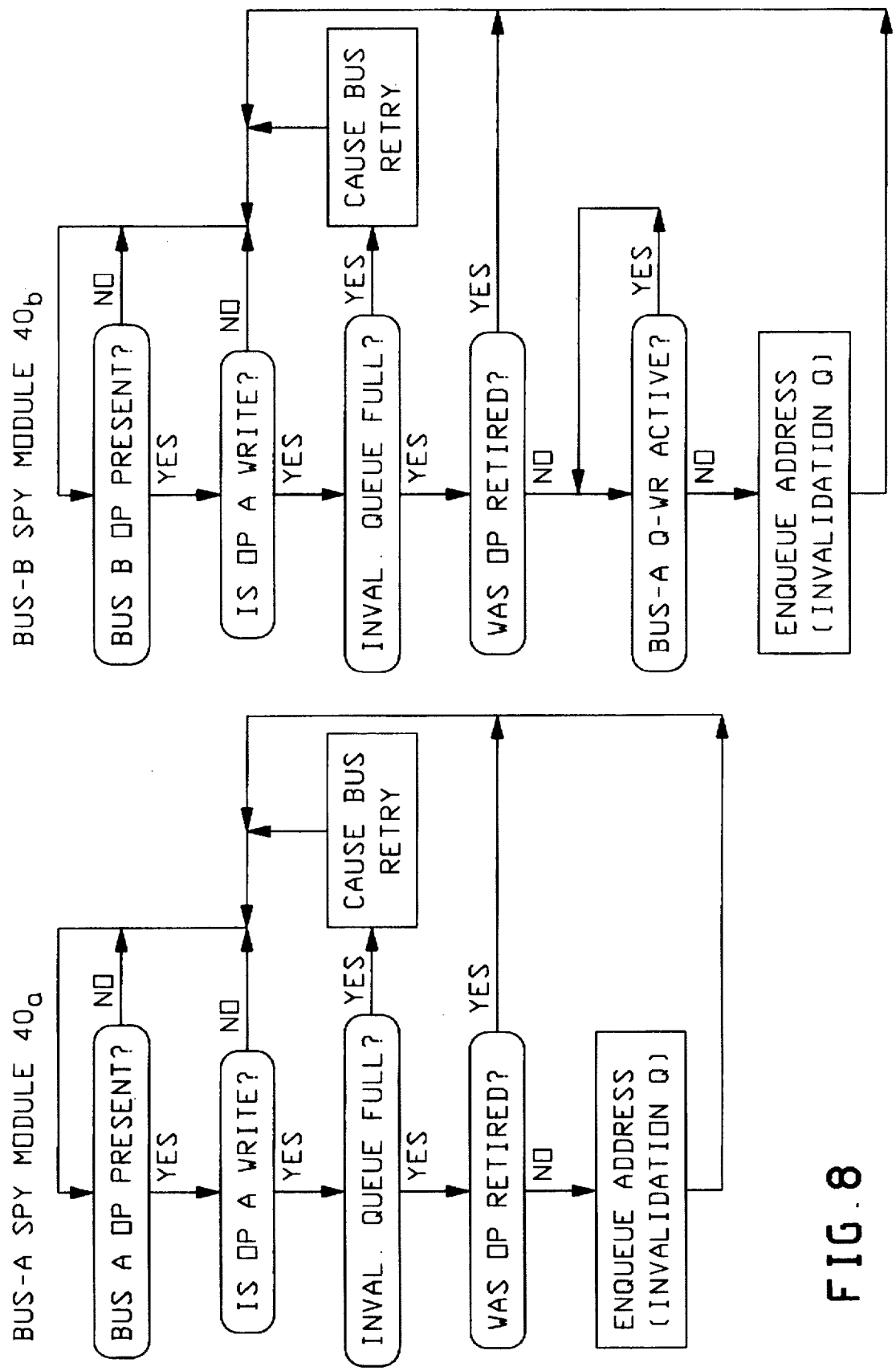
FIG. 8 is a flow diagram showing how the bus spy modules insert an address into the invalidation queue.

Referring to FIG. 8, there is seen the functioning of the system bus spy module state machines $40_a$ and $40_b$. The state machine operations will check to see if there is an operator on the bus. If there is, the state machine checks to see if the operator is a "write". If so, it then checks to see whether the invalidation queue $28_{iq}$ is full.

If the invalidation queue is full, then the system will return back for a later "retry" of this operation. If there was no retry necessary, then the selected address is placed in the invalidation queue $28_{iq}$.

The only difference in the Bus B spy module $40_b$ is that the next to the last step checks to see whether the opposite bus, (the A bus) was active with a write operation. If not, then the selected address from bus 22B is placed in the invalidation queue $28_{iq}$.

Figure 9:
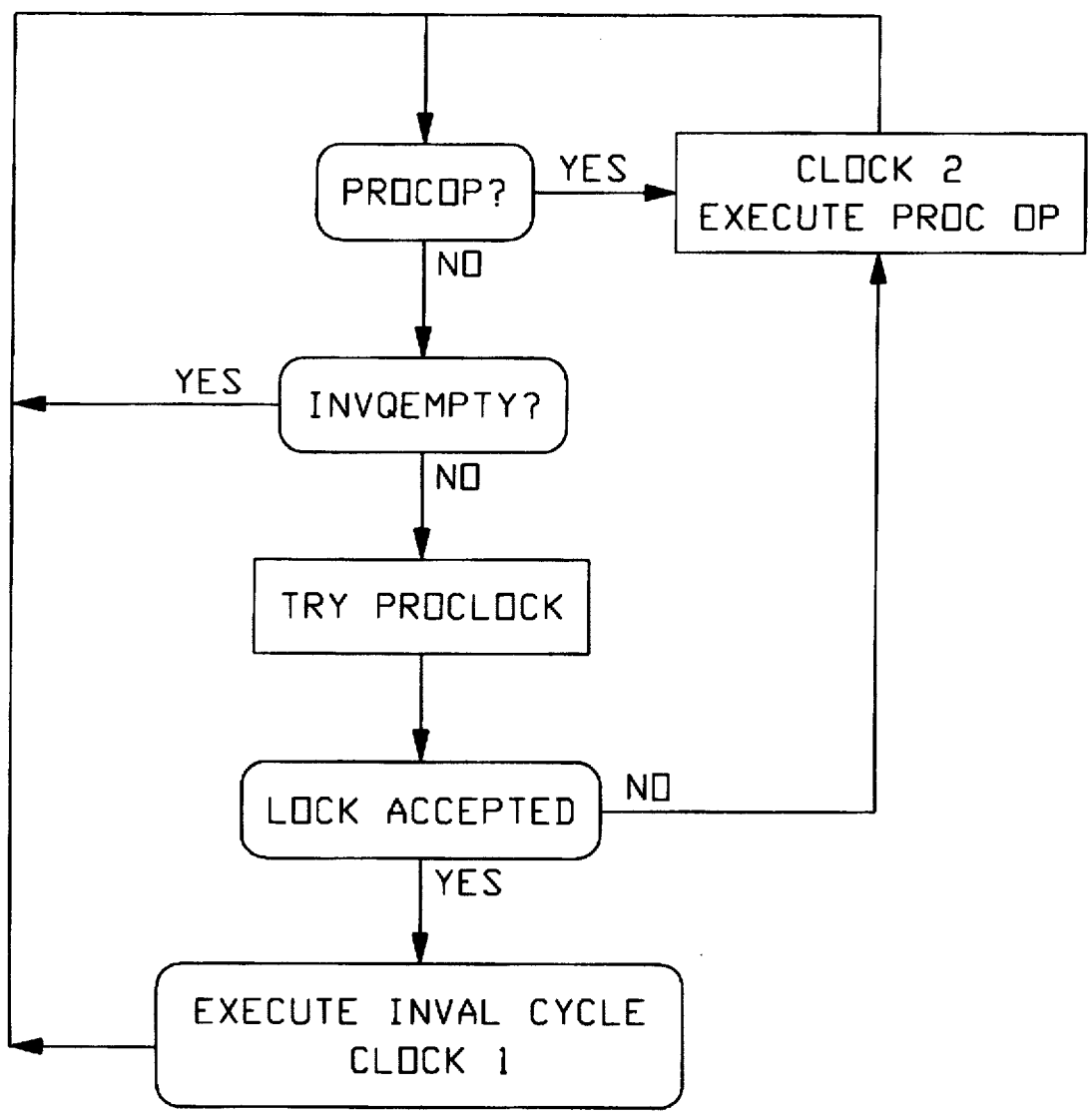
FIG. 9 is a flow chart of operations for the main external state machine.

Referring to FIG. 9, there is seen the main external state machine 30 and a flow chart of its major functional operations.

State machine 30 will check to see if there is a processor operator (OP) pending. If this the case, then the processor will execute this operator on the second clock period (clock 2) as will be noted in FIG. 12 (timing diagram).

If there is no processor operator (OP) pending, then the system will check to see if it can "lock out" any processor operations. If the invalidation queue is not empty, that is to say, there are addresses waiting to be invalidated, then the system will see if it can lock out the processor operations at this point (if the processor is not in the middle of an operation cycle).

Figure 12:
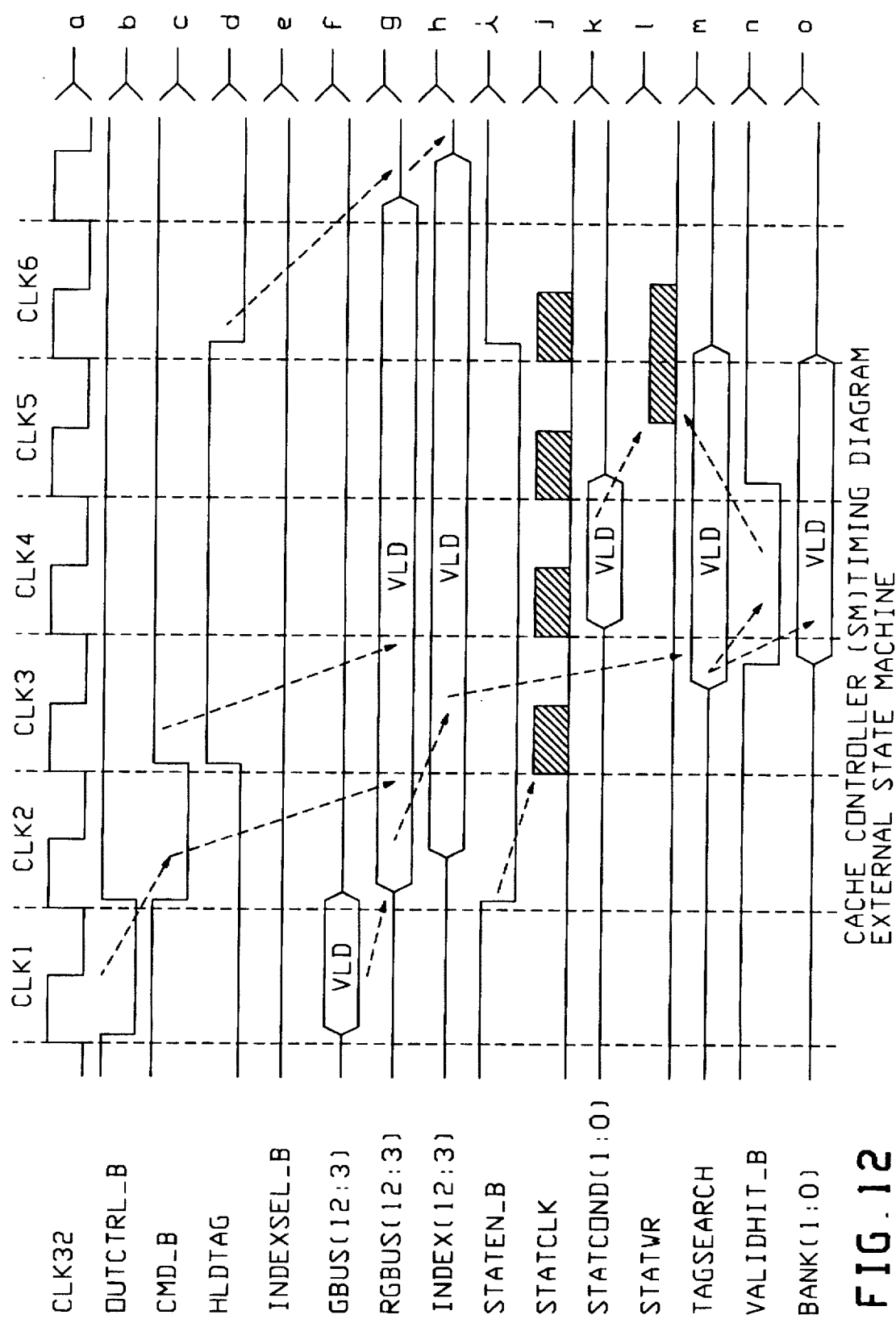
FIG. 12 is a timing diagram showing the clock cycle operations under control of the external main state machine.

If the processor lock is accepted, (and no processor cycle is being executed), then the external state machine 30 will execute the invalidation cycle during the clock 1 period seen in FIG. 12.

Figure 10:
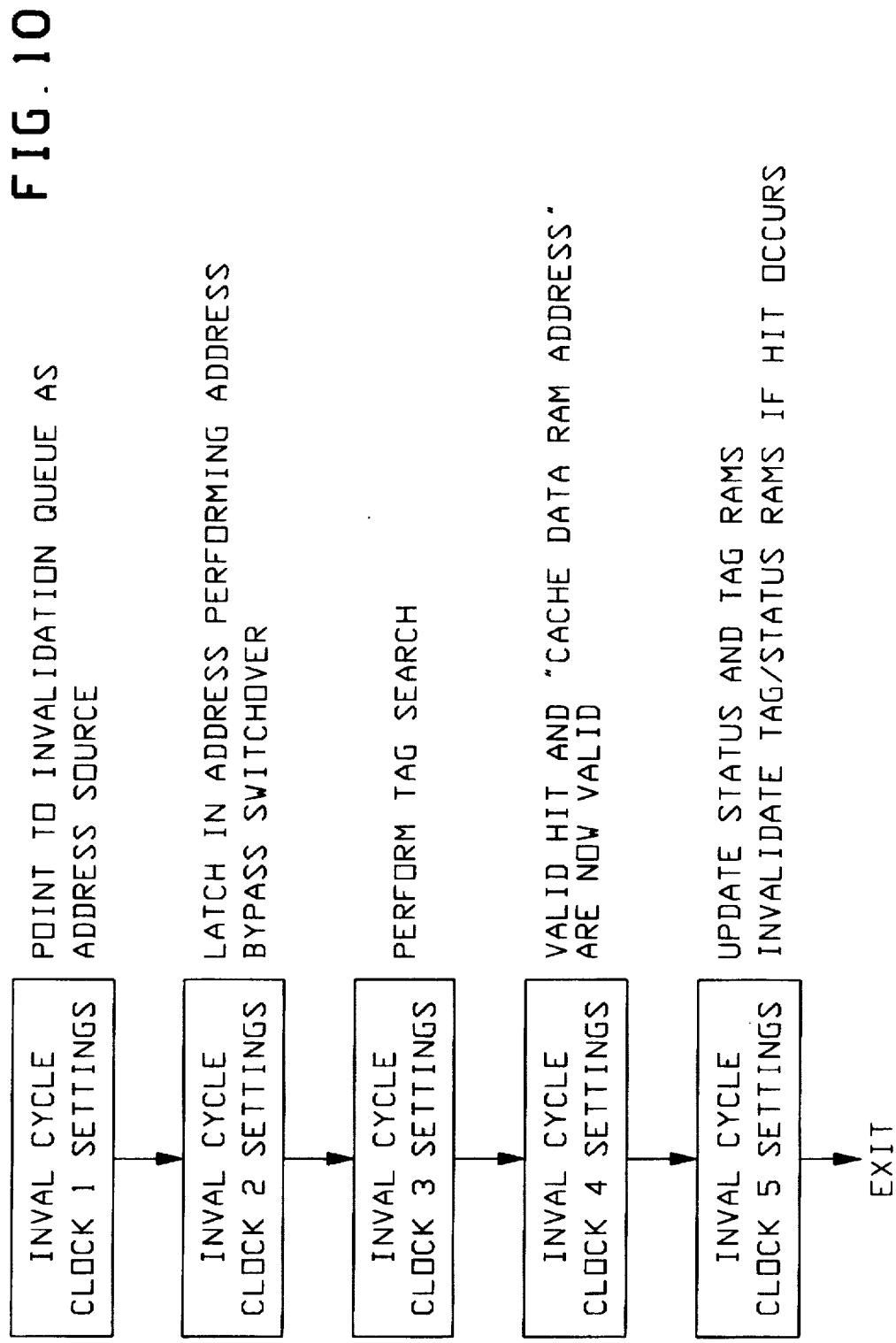
FIG. 10 is a flow chart showing the invalidation cycle under control of an external main state machine.

FIG. 10 is a flow chart showing the invalidation cycle functions performed by the main external state machine 30.

At the clock 1 period, (referring to FIG. 12 and 13), the external state machine points to the invalidation queue, $28_{iq}$, as an address source.

At the clock 2 period, of the invalidation cycle, the address is latched in, in order to perform an address bypass switch-over.

At the clock 3 period, of the invalidation cycle, the state machine 30 will perform a tag search in the tag/status array 28.

At the clock 4 period, of the invalidation cycle, it is seen that the "valid" hit and the "cache data RAM (16) address" are both valid.

At the clock 5 period, of the invalidation cycle: in the tag/status RAMS if a hit occurred, there has been an update of the status and the tag RAMS in Tag Status Array module 28 (FIG. 2) involving the status RAM 56 and the Tag CAMS 54 of FIG. 3.

Figure 11:
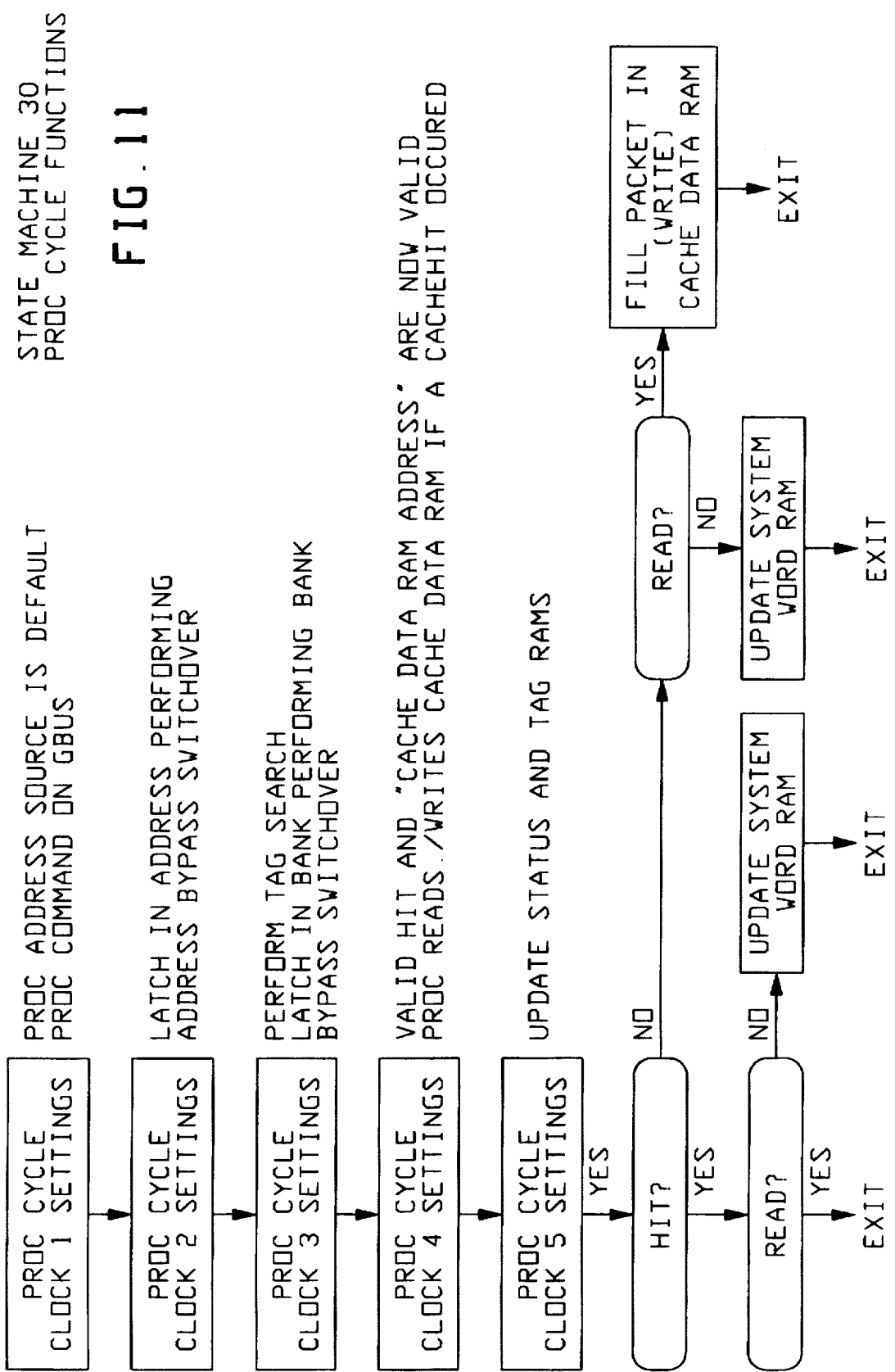
FIG. 11 is a flow chart showing the normal processor operations in functional steps controlled by the main external state machine.

FIG. 11 is a flow chart showing control operations for the normal processor functions with the store-through cache operation. The clock periods are shown in FIG. 12. Here, during the clock 1 period, there is a command on the GBUS 12 and the Tag Search address source is from a GBUS 12 command word so that state machine 30 takes a default path. Then on clock 2 of the processor cycle, the GBUS address is latched-in, providing an address bypass switch-over.

During the clock 3 period, of the processor cycle, the state machine 30 performs a tag search in CAMs 54 (FIG. 3) so that one of the Tag RAM banks of 54 (0, 1, 2, 3) is latched-in in order to perform a bank bypass switch-over. Output lines from the banks $54_{0,1,2,3}$, are seen in FIG. 3 at lines $54_y$, (8 lines).

During the time period of clock 4, the "valid hit" signal and "cache data RAM address" are both valid and the processor reads/writes the cache data RAM 16 if a cache hit has occurred.

During the clock 5 time period of the processor cycle, the status RAM's 56 and the tag RAMs 54 are updated. If a hit occurs and the operation is a "Read," the processor can access data from the cache 16. However, if the command is a Write, then the system main memory (RAM) is updated to complete the store-through operation and maintain coherency with the cache.

During the clock 5 period, if there was no hit for the cache, then the state machine 30 will check for a "Read" command which, if extant, will read out the required 4-word data packet from main memory and write it into the cache data RAM 16. If the command is not a Read but a "Write", then the state machine 30 will update the system main memory with the proper word to be overwritten.

FIG. 12 is a timing diagram of the functioning of the cache controller external state machine 30.

Line (a) of this drawing shows the clock period signals which are designated as clock 1 through clock 6, etc.

Line (b) of FIG. 12 is a Q output control signal on line $f_1$ of FIG. 5.

Line (c) of FIG. 12 is a command from the operation decoder in data path 244 and shown as line $f_2$ in FIG. 5.

Line (d) and line (e) of FIG. 12 show the hold-tag and index select signal which occur on bus lines $f_3$ of FIG. 5.

Line (f) of FIG. 12 is the valid signal on GBUS 12 of FIG. 5.

Line (g) of FIG. 12 shows the register bus signal inside data path module $26_d$.

Line (h) shows the address index signal on line $56_x$ of FIG. 3.

Line (i) shows the status enable signal on line $f_4$ of FIG. 5.

Line (j) shows the STATCLK signal in the address control $26_a$, FIG. 2A, which is sourced from the status RAM 56, FIG. 3.

Line (k) shows the status condition signal at line $f_5$ (FIG. 5) which derives from update status circuitry 55 in FIG. 3.

Line (l) for the status write signal derives from the status Register MUX circuitry block 53, FIG. 3.

Line (m) shows the tag search which is seen in FIG. 5 on line $f_3$.

Line (n) is the valid hit signal and is shown as the output line $52a$ from the tag/search decoder logic 52, of FIG. 3.

Line (o) shows the bank select address line $52b$ in FIG. 3.

The signals on line (n) "valid hit" and on line (o) "bank select," have the purpose of providing a tag search in order to resolve the question as to whether there is a hit and which bank it is in.

Thus, FIG. 12 shows the basic six-clock cycle, which each clock period is numbered across the top on line (a). The status RAM inputs are shaded in order to highlight the status RAM 56 timing requirements. The index address must be stable when the clock is high and the clock must be high (active) in order to write or read the status RAM 56. The state machine 30 controls this timing.

A cache operation will generally consist of a fixed six-clock cycle, in some cases with a few deviations, such as in a fill cycle or an invalidation cycle.

CLOCK 1 OF TYPICAL CACHE OPERATION:

Here, the external state machine 30 directly interfaces to the GBUS 12. The operations decoder in $24_d$ (FIGS. 3, 5) determines if the operation is a "cache operation" and if so, then the operation decoder pulses the command (CMD) signal to the state machine 30 in clock 2.

CLOCK 2 OF TYPICAL CACHE OPERATION (FIG. 12):

The cache controller index address must become valid by the end of clock 2 and remain valid through each clock that produces a status RAM clock. When the tag search address source is from a GBUS 12 command word, then the state machine 30 takes the default path. In clock 2, the GBUS address is latched in the GBUS register. The index address comes from the GBUS register by default. FIG. 13 illustrates the various address sources.

When the tag search address source is from the program word address register, PWAR 27, FIG. 2A, the operation decoder in $24_d$, FIG. 5, will set the program word address register operator active in clock 2.

When the tag search address source is from the invalidation queue $28_{iq}$, then a different sequence of events will occur. When the invalidation queue $28_{iq}$ is "not empty" and in the idle state, and there is no conflicting GBUS operation, the external state machine 30 will go "busy" to the processor in order to take ownership of the bus. After ownership has been confirmed by another clock with no GBUS operation, the external state machine 30 will select the invalidation queue as the address source. An index address flip-flop is put into a "load" mode for one clock and then into a "hold" mode to stabilize the index address. The operation then continues through the normal six-clock path of FIG. 12. This protocol produces an eight-clock invalidation cycle when the invalidation queue is "not full". When the invalidation queue is "full", the external state machine 30 holds onto the GBUS 12 and executes a pipeline five-clock invalidation cycle until the invalidation queue is "not full".

CLOCK 3: (Cache Operation)

Starting at clock 3, the external state machine 30 sequences the cache controller 24 through its tag search, and depending on the operation, will allow or cause certain operations to occur. However, the state machine cannot respond to an operation until this clock is completed. The operation decoder (FIG. 5) in module $24_d$ will continue to set the signal state enable STATEN-B in an active state in order to enable the clocking of the status RAM 56 in clock period 4.

Depending on the operation, the status RAM update logic 55, FIG. 3 must have certain defined situations into which it will write to the status RAM 56.

CLOCK 4: (Cache Operation)

On clock 4, the external state machine 30 knows if the tag search was a "hit" or not depending on the state of the signal "HIT-B". The hit becomes active early in clock 4. During the tag/search type of operations, the external state machine 30 will respond accordingly.

In clock 4, the cache RAM address is valid. In a "read" operation, the processor 10 can read from a valid cache line if a cache hit was detected. If a cache "miss" was detected, then a "cache fill operation" is executed.

In a "write" operation, the cache RAM 16 can be written to under the state machine's control if a hit was detected. If during a "write" operation, a miss occurs, then the cache does nothing. The cache RAM address remains valid throughout the period of clock 5.

During a "fill" operation, the bus interface unit BIU 15 sends four EMODE words to the cache RAM 16 allowing the external state machine to write them into the RAM cache 16.

The external state machine 30 will set the signal "CLK-GATE" active in order to enable the clocking of the status RAM 56 by means of the operation decoder in module $24_d$. In response to this, the operation decoder (FIG. 5) will set the signal STATEN-B active in clock 5 to enable the status RAM clock in clock 6.

Thus, in clock 5, the data to the status update register in circuit block 55 is valid by the end of the clock.

CLOCK 5: (Cache Operation)

In this clock, the status update register in block 55 will have been loaded with valid data and the status RAM 56 can be written into (if a fill or an invalidation cycle is required). The status update register sources the data into the status RAM 56. It will be put in the "hold" mode on this clock so that the data will remain valid through clock 6 also.

In clock 5, the cache controller internal tag RAM 54 may be written into. On a read "miss" for example, the tag of the new line is written into the selected banks of the tag RAM 54. The external state machine 30 will set the signal CAMRD active in order to write to the tag RAM 54.

In clock 5 of a "read hit" of a code fetch operation, the cache RAM data-out is held active, because the processor 10 does not read this data until clock 5. Due to this, the cache RAM address must remain stable throughout clock 5.

The external state machine 30 must set the signal CLK-GATE inactive, in order to disable the clocking of the status RAM 56. In response to this, the operation decoder in $24_d$ will set the signal STATEN-B in the active state in clock 6, in order to disable the status clock after clock 6.

CLOCK 6: (Cache Operation)

In the first half of clock 6, the status RAM 56 may be written to, depending on the operation and the result of the TAG search. Clock 6 is also used to hold off the processor 10 while the operation is completed without violating the cache controller internal RAM timing. The signal "BUSY-B" is negated in this clock in order to guarantee that another operation cannot start until after clock 6 has been completed.

In most operations, the external state machine 30 will complete its operations by passing through an idle return state. This state allows for the proper ending of an operation without any conflicts or violation of other device timings, especially in regard to the index address, the status RAM operations, and the GBUS operations. This idle return state is usually in either clock 5 or clock 6, dependent on the operation. Also, this state will set the default values as the state machine branches to an "idle" condition, after which it can branch to an idle return condition with any valid signal active or inactive.

The "idle return" state of the external state machine 30 is also used to prevent invalidation cycles from being locked-out. This is so, since the processor 10 can "override" the state machine's attempt to take on the GBUS 12 for use in an invalidation cycle. The "idle return" state, if the invalidation queue $28_{iq}$ is "full", will not negate the signal BUSY-B and force invalidation cycles until the invalidation queue is "not full".

FIG. 13 is a simplified drawing showing the routing of addresses and data in the cache controller system.

The address control module $26_a$ of FIG. 2A, can receive input addresses from the three separate sources shown in FIG. 13 which are shown as (i) the invalidation queue $28_{iq}$, (ii) the processor commands from processor 10; and (iii) from the program word address register 27. These three source modules will also feed the data path unit $26_d$ shown in FIG. 13.

The address control $26_a$ acts as a select address source unit in order to provide addresses to the cache data RAM 16 and/or to the tag/status array 54, 56 of FIG. 3.

Similarly, the data path module $26_d$ will select the data sources from the invalidation queue, the processor command or the program word address register for conveyance to the tag/status array 28 with reference to the status RAM 56 and address banks 54 of FIG. 3.

Thus, the invalidation queue $28_{iq}$ can address the tag/status array 54, 56 of the tag status array module 28 (FIG. 2A) and cause an invalidation of a particular address if a hit occurs for that address.

Similarly, a processor command and address from processor 10 can be fed to the tag/status array 54, 56. If a hit occurs, the address can be retrieved from the cache data RAM 16 for use by the processor 10.

Described herein has been a network using dual system busses for communicating with a central processor having a store-through cache working with state machines and a cache controller chip to provide an operating method for insuring cache coherency by invalidation of cache data packets which are no longer coherent with updated new data words.

What is claimed is:

1. In a network having a central processor means connected via a bus interface unit to first and second busses of a dual system bus means and using a store-through cache memory means regulated by use of a cache control module with an invalidation queue, and using an external state machine controller working with first and second internal state machine spy modules sensing said dual system bus means which carry addresses of a packet of four new data overwrite words, a method for handling invalidation cycles for disabling stale data packets in said cache memory means without substantially inhibiting said central processor means access to said cache memory, comprising the steps of:

(a) identifying, via said first and second internal state machine spy modules, the address of a packet of four new data overwrite words appearing on said first and second busses of said dual system bus means;

(a1) determining whether said first/second internal state machine spy module on said first and second busses is already active in transmitting a new data overwrite address to said invalidation queue;

(a2) transmitting a new data overwrite address to said invalidation queue in one clock period when said second/first internal state machine spy module is inactive;

(b) determining whether said invalidation queue is full or has locations available for address storage by monitoring via said external state machine, of the status of said invalidation queue to give priority to invalidation cycles when said invalidation queue is full;

(c) signaling said external state machine when said invalidation queue is full and needs immediate attention;

(d) transmitting said new data overwrite packet address for storage into said invalidation queue if a location is available therein;

(e) executing an invalidation cycle to invalidate any matching address in said cache memory means by giving priority of cache memory access to said invalidation cycle after locking-out said central processor means during a period when it is not executing a command;

(f) establishing priority of said central processor request for cache memory access over a concurrent request for access to said invalidation queue except when said invalidation queue is full;

(g) executing repeated access trials, when said invalidation queue is full, of said new data overwrite packet address on said first or second busses for re-transmitting said new data overwrite address at a later period when said invalidation queue is no longer full;

(h) pointing to said invalidation queue as an address source;

(i) selecting an address from said invalidation queue for a search of said cache memory means;

(j) performing a tag search in a tag/status array in said cache control module using said selected packet address;

(j1) checking each parity address in said invalidation queue which is selected fro a tag search in said tag/status array;

(k) establishing existence of a matching address in said tag/status array (hit);

(l) setting an invalid signal bit against the matching address in said tag/status array;

(m) sensing, by said tag/status array, the occurrence of a multiple-hit condition, in said cache memory means on a single address search;

(n) generating a multiple hit error signal to said central processor means upon occurrence of a multiple hit condition.

2. In a network having a central processor means with store-through cache memory connected via a bus interface unit to first and second busses of a dual system bus means, said network enabling cache memory access by said central processor means while also enabling completion of invalidation cycles to said cache memory, said cache memory having a cache controller holding an invalidation queue, a system for regulating the allocation of periods for cache access by said central processor means and completion of invalidation cycles in said cache memory comprising:

(a) means for normally granting priority of access to said cache memory for said central processor means;

(b) means for sensing the status of said invalidation queue including:

(b1) means to sense when said invalidation queue is full including:

(b1a) external state machine means for sensing when said invalidation queue is full, including:

(i) means to lock out said central processor means and grant priority to completion of invalidation cycles from said invalidation queue;

(b2) means to permit continuance of a cache access cycle by said central processor means which is already in operation;

(b3) means to enable repeated access request-trying cycles for invalidation operations to said cache memory when said cache memory has been unavailable for completion of an earlier invalidation cycle request;

(c) said cache memory including:

(c1) multiple memory banks where each memory bank includes N address index lines, each said address index line including:

(i) means for storing a 4-word upper packet and a 4-word lower packet;

(ii) means for selecting said upper or lower packet (iii) means for selecting a specific word in said selected 4-word packet;

(d) said dual system bus means including:

(d1) first and second state machine spy means for sensing the appearance of the address of a new data overwrite packet on said first and second busses, each said state machine spy means including:

(d1a) means to transmit said new data overwrite address to said invalidation queue in one clock cycle;

(e) means to sense multiple hits occurring in said cache memory during a read cache operation or during a cache invalidation cycle.

* * * * *